United States Patent [19]
Ohtake

[11] Patent Number: 5,630,181
[45] Date of Patent: May 13, 1997

[54] VARIABLE FOCAL LENGTH OPTICAL SYSTEM

[75] Inventor: Motoyuki Ohtake, Kawasaki, Japan

[73] Assignee: Nikon Corporation, Tokyo, Japan

[21] Appl. No.: 709,508

[22] Filed: Sep. 6, 1996

[30]  Foreign Application Priority Data

Sep. 18, 1995 [JP] Japan .................... 7-263581

[51] Int. Cl.$^6$ .................... G03B 17/00
[52] U.S. Cl. .................... 396/72; 359/676
[58] Field of Search .................... 359/676; 396/72

[56]  References Cited

U.S. PATENT DOCUMENTS

| | | | |
|---|---|---|---|
| 5,042,927 | 8/1991 | Ogawa et al. | 359/676 |
| 5,105,311 | 4/1992 | Tokumaru et al. | 359/676 |
| 5,113,287 | 5/1992 | Nakayama | 359/676 |
| 5,202,992 | 4/1993 | Banno et al. | 359/676 |
| 5,218,476 | 6/1993 | Ito | 359/676 |
| 5,309,285 | 5/1994 | Ito | 359/676 |
| 5,414,562 | 5/1995 | Ueda | 359/676 |
| 5,424,870 | 6/1995 | Hashimura et al. | 359/676 |
| 5,434,712 | 7/1995 | Ito | 359/676 |
| 5,493,448 | 2/1996 | Betensky et al. | 359/676 |
| 5,499,141 | 3/1996 | Ohtake | 359/676 |
| 5,585,969 | 12/1996 | Endo | 359/676 |

FOREIGN PATENT DOCUMENTS 6-265788  9/1994  Japan .
7-27979  1/1995  Japan .

*Primary Examiner*—Russell E. Adams
*Attorney, Agent, or Firm*—Shapiro and Shapiro

[57]  ABSTRACT

A variable focal length optical system includes a first lens unit (G1) having a positive refractive power and arranged to be closest to an object, a final lens unit (Gb) having a negative refractive power and arranged to be closest to an image, the first lens unit (G1) and the final lens unit (Gb) moving to the object side when a focal length of an entire lens system changes from a smallest focal length state to a largest focal length state, and an aperture stop arranged on an image side of the first lens unit (G1) and on an object side of the final lens unit (Gb), wherein the variable focal length optical system satisfies the following conditions:

$$0.25 < |fb|/f1 < 0.45$$

$$0.7 < M1/f1 < 0.9$$

$$0.4 < |fb|/Mb < 0.5$$

$$D/fw < 0.7.$$

7 Claims, 45 Drawing Sheets

FIG. 3A  FIG. 3B  FIG. 3C

FNO = 4.46

SPHERICAL ABERRATION
1.000

Y = 21.60

ASTIGMATISM
1.000

Y = 21.60

DISTORTION
5.000%

FIG. 3D  Y = 21.6  A = −29.06  COMA

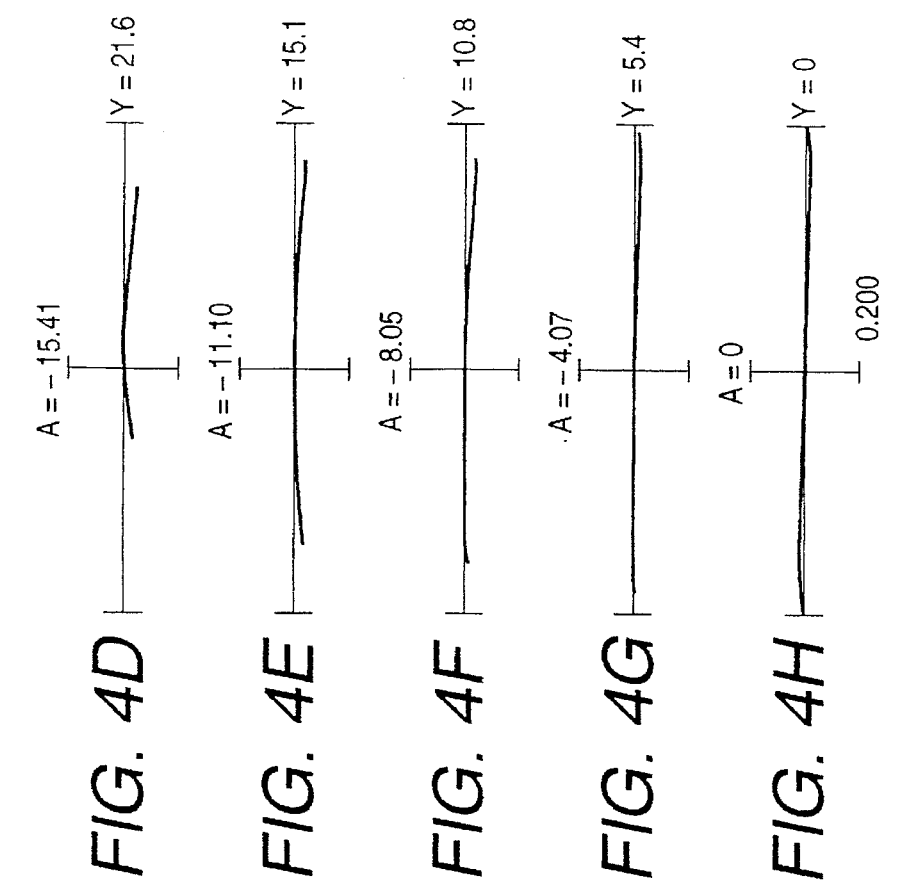
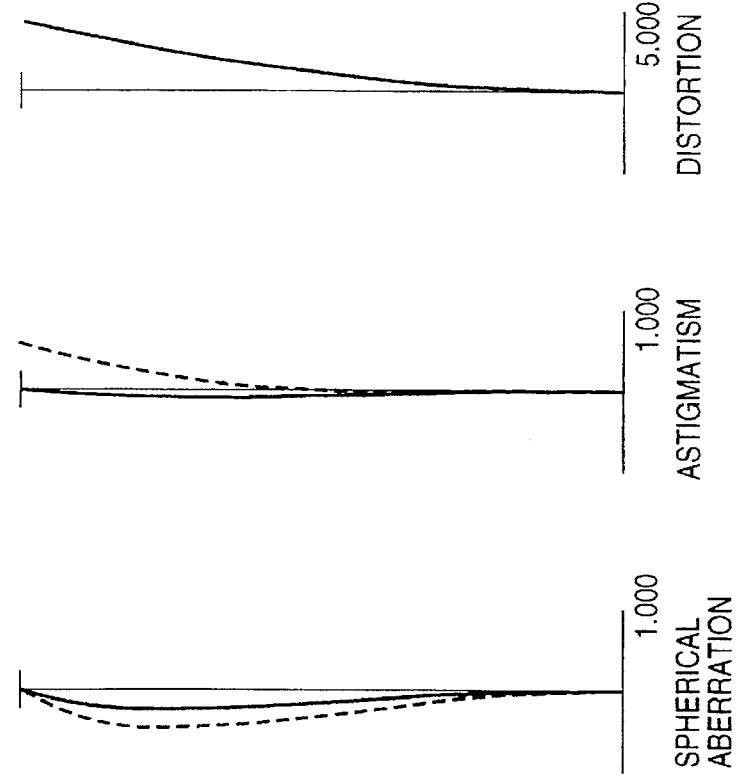

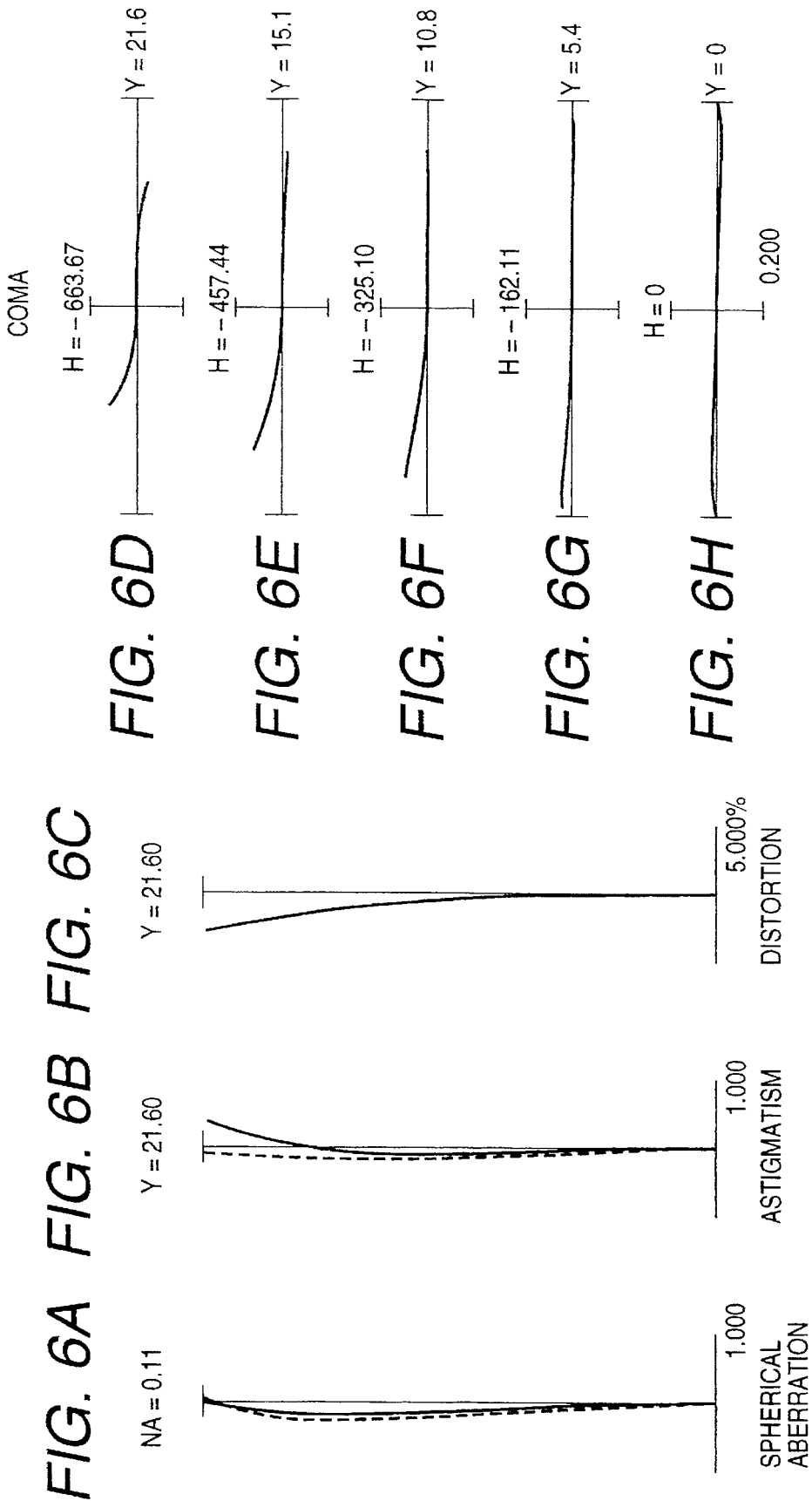

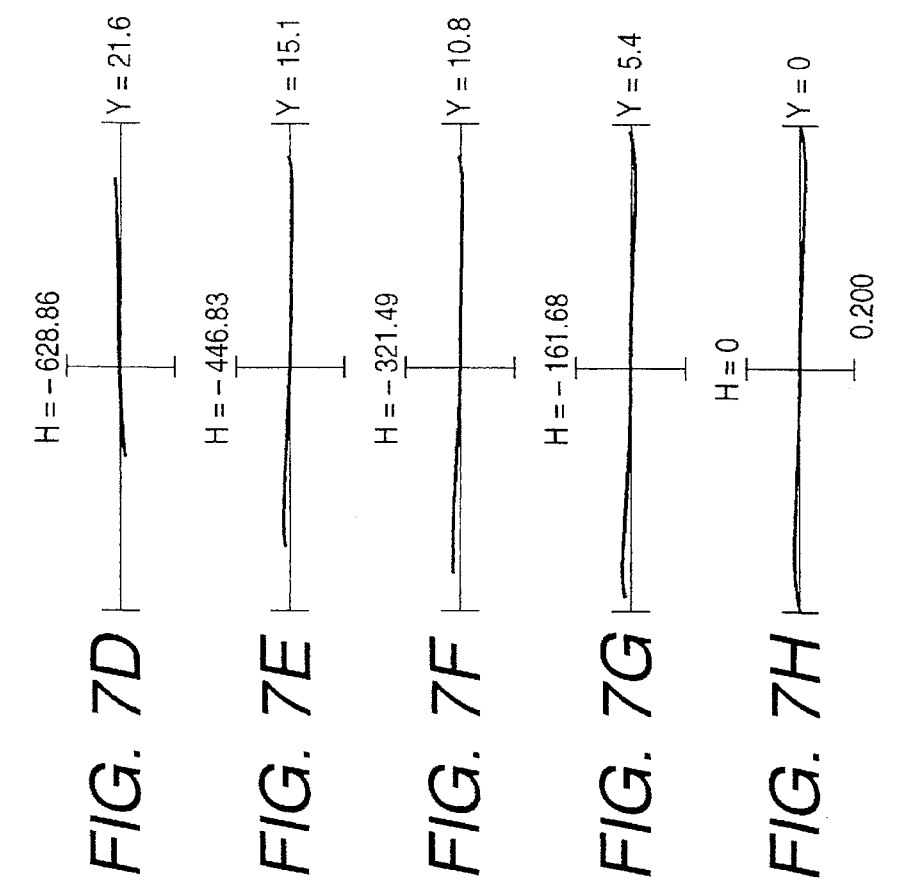
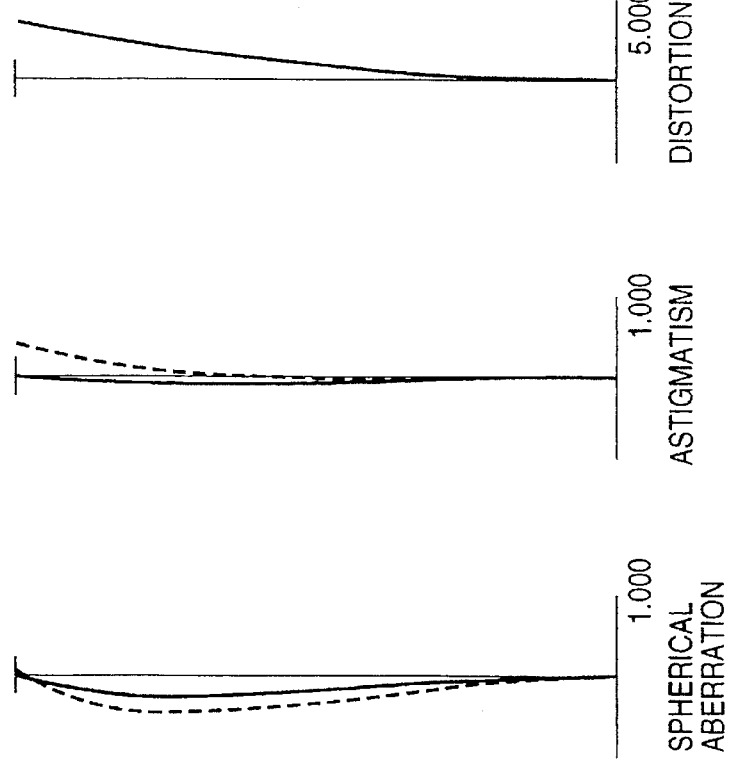

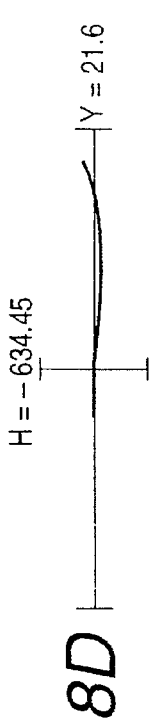
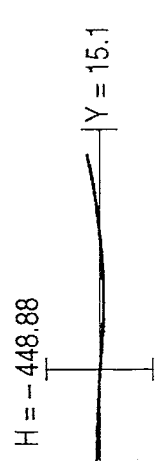
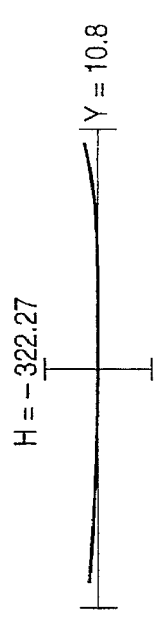
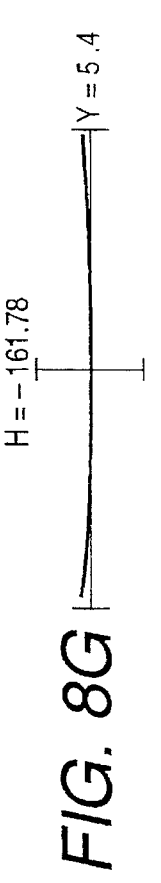
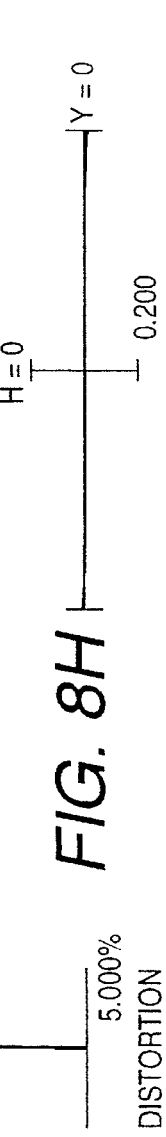

FIG.10A  FIG.10B  FIG.10C  FIG.10D  FIG.10E  FIG.10F  FIG.10G  FIG.10H

FNO = 4.49

Y = 21.60

Y = 21.60

SPHERICAL ABERRATION  1.000

ASTIGMATISM  1.000

DISTORTION  5.000%

COMA

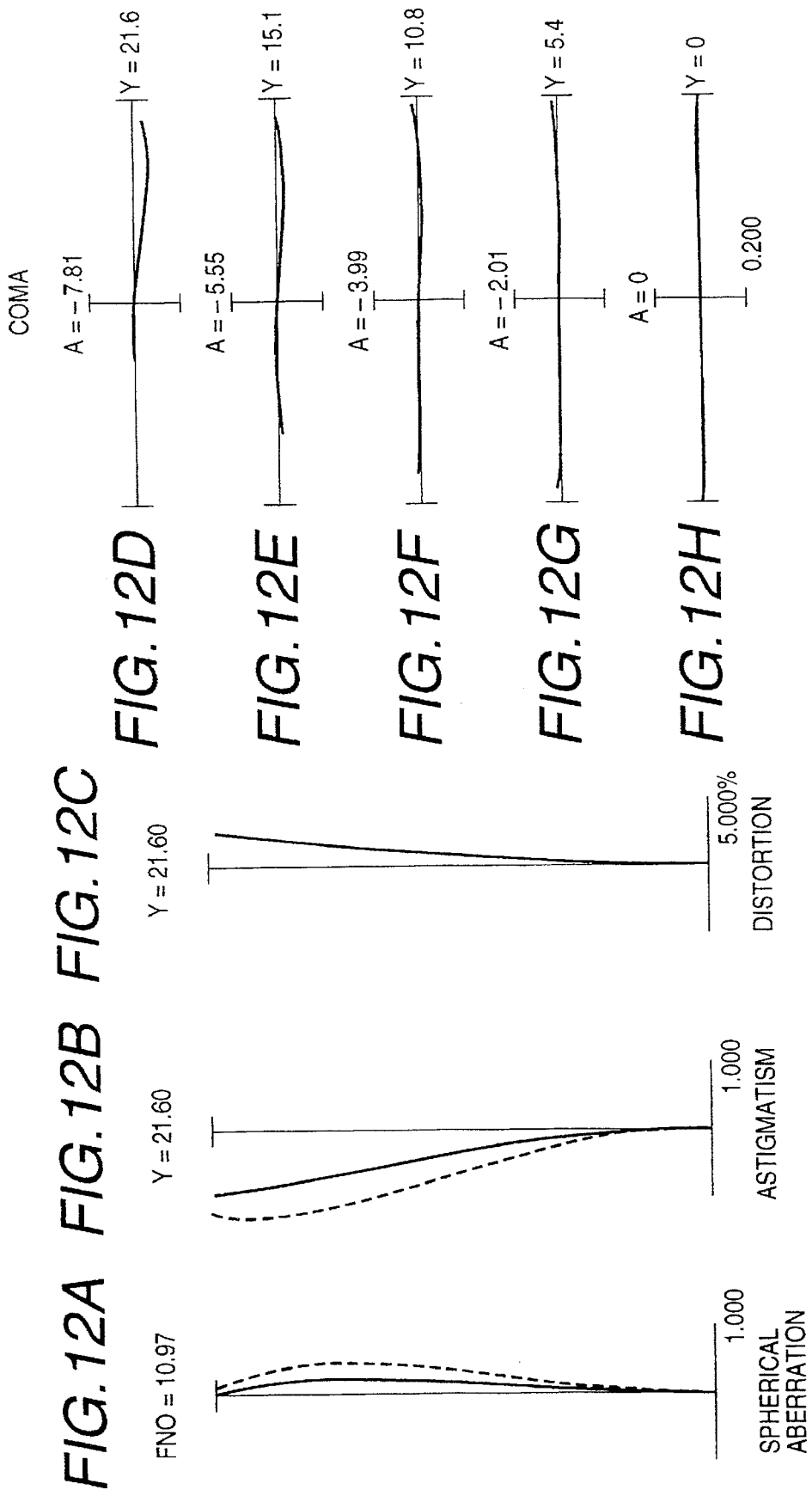

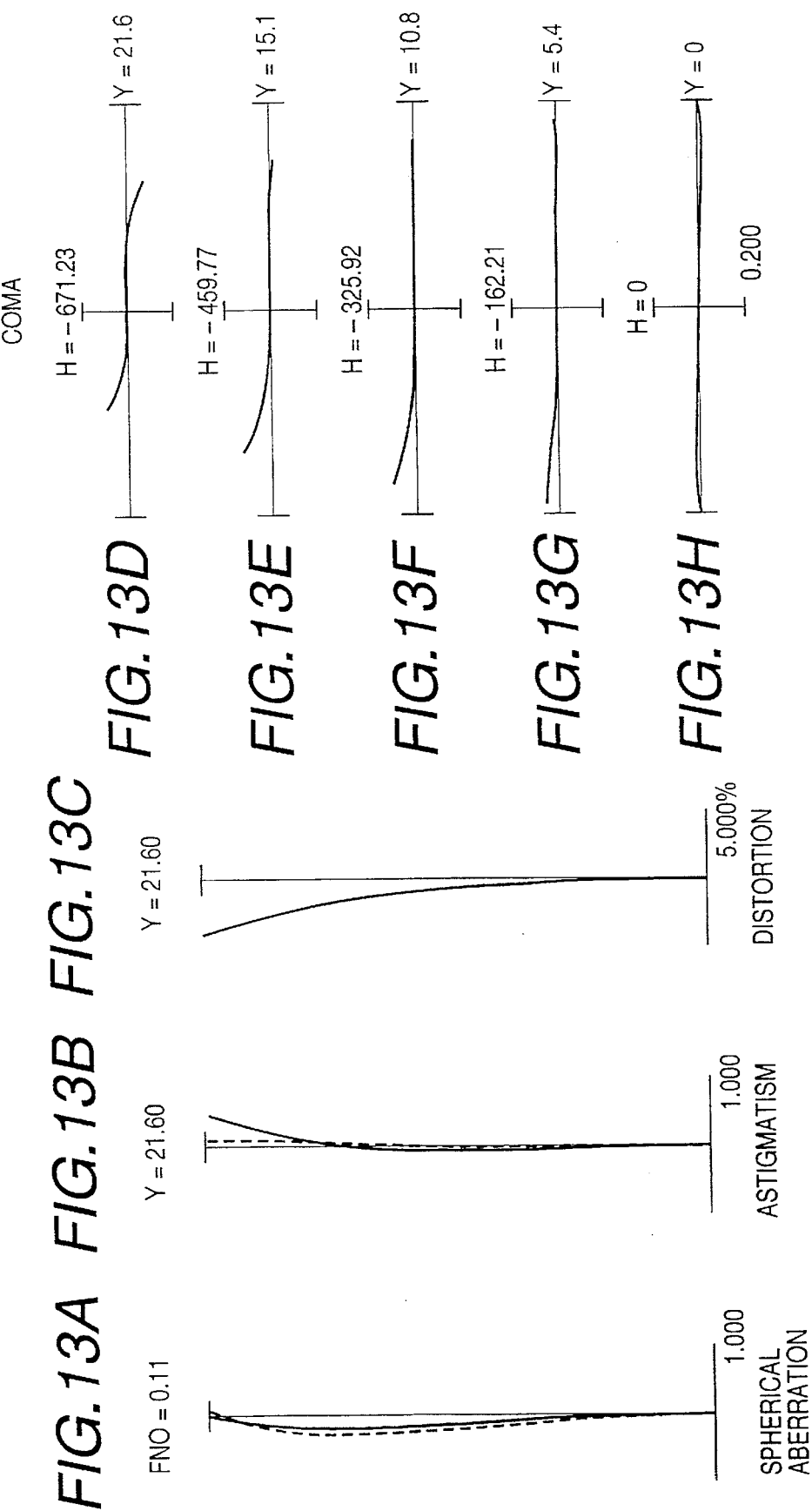

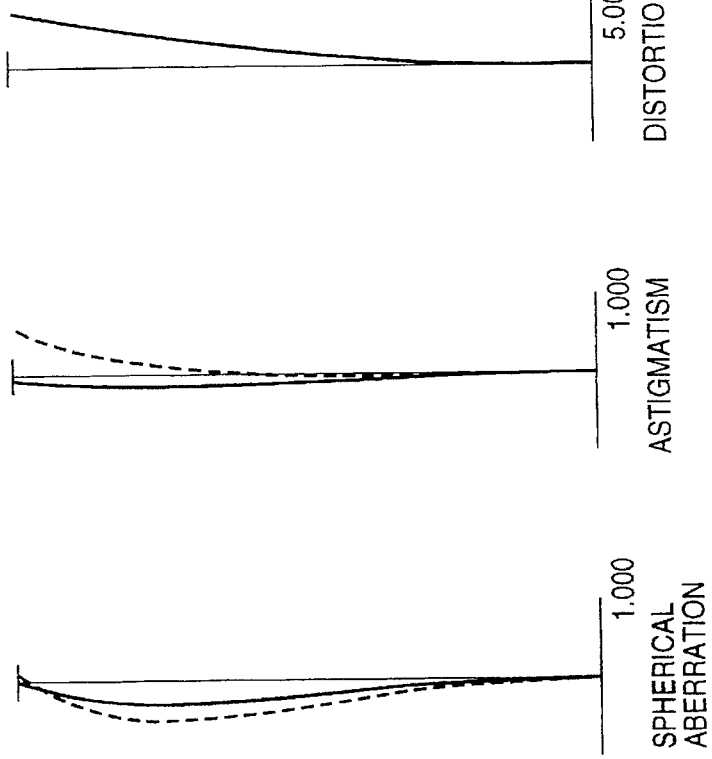

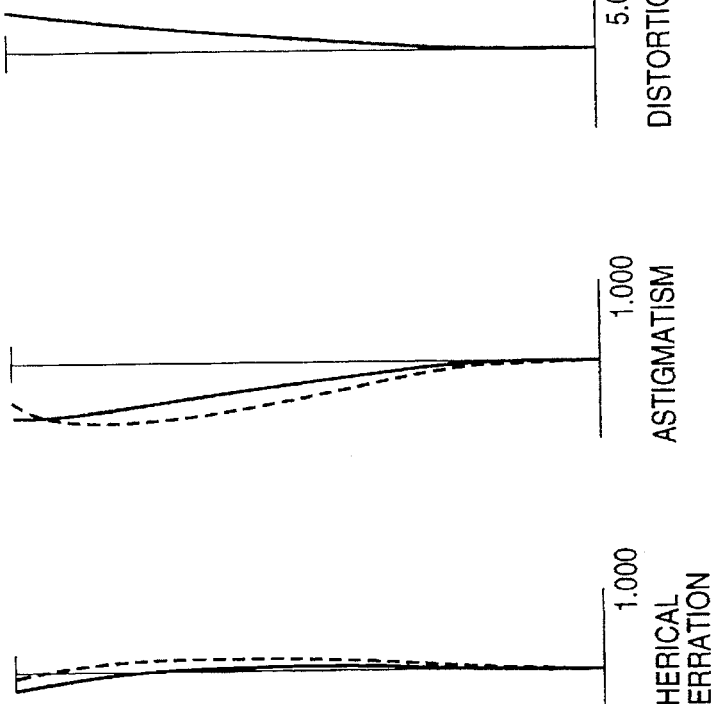

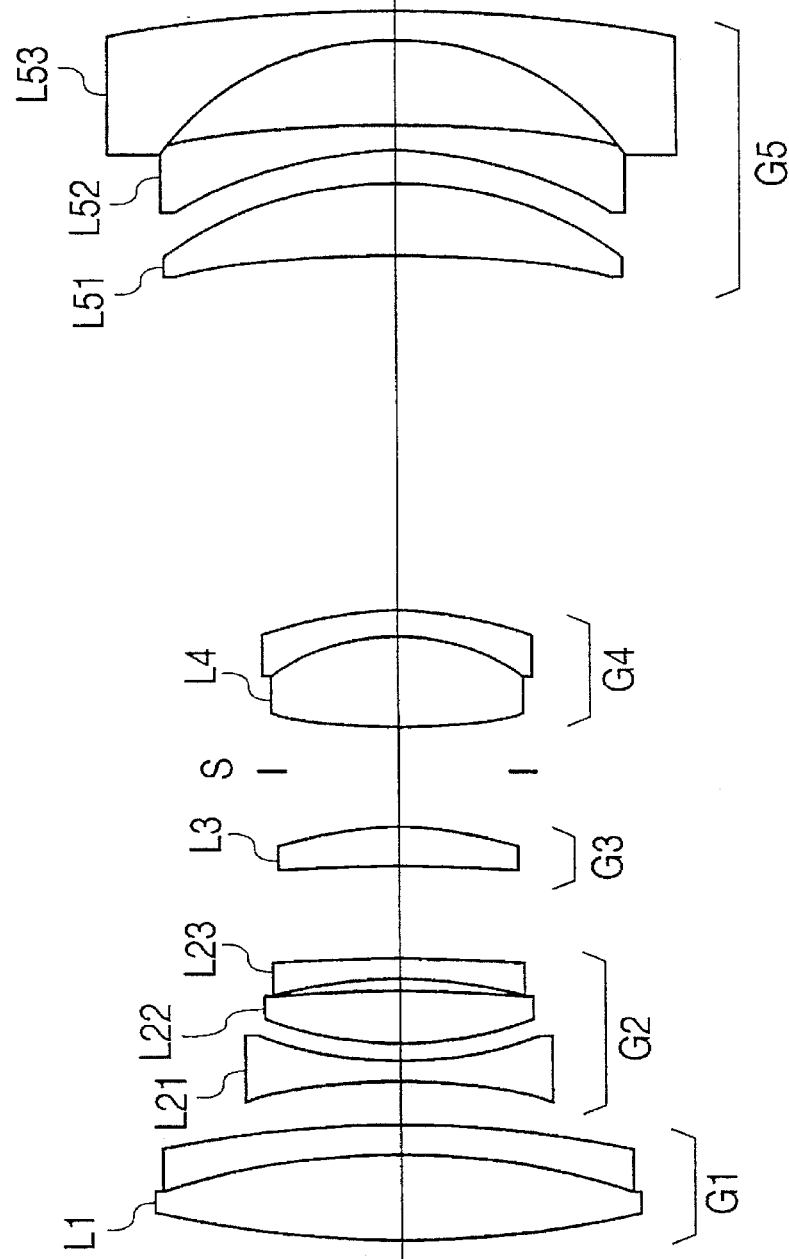

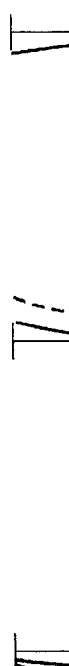

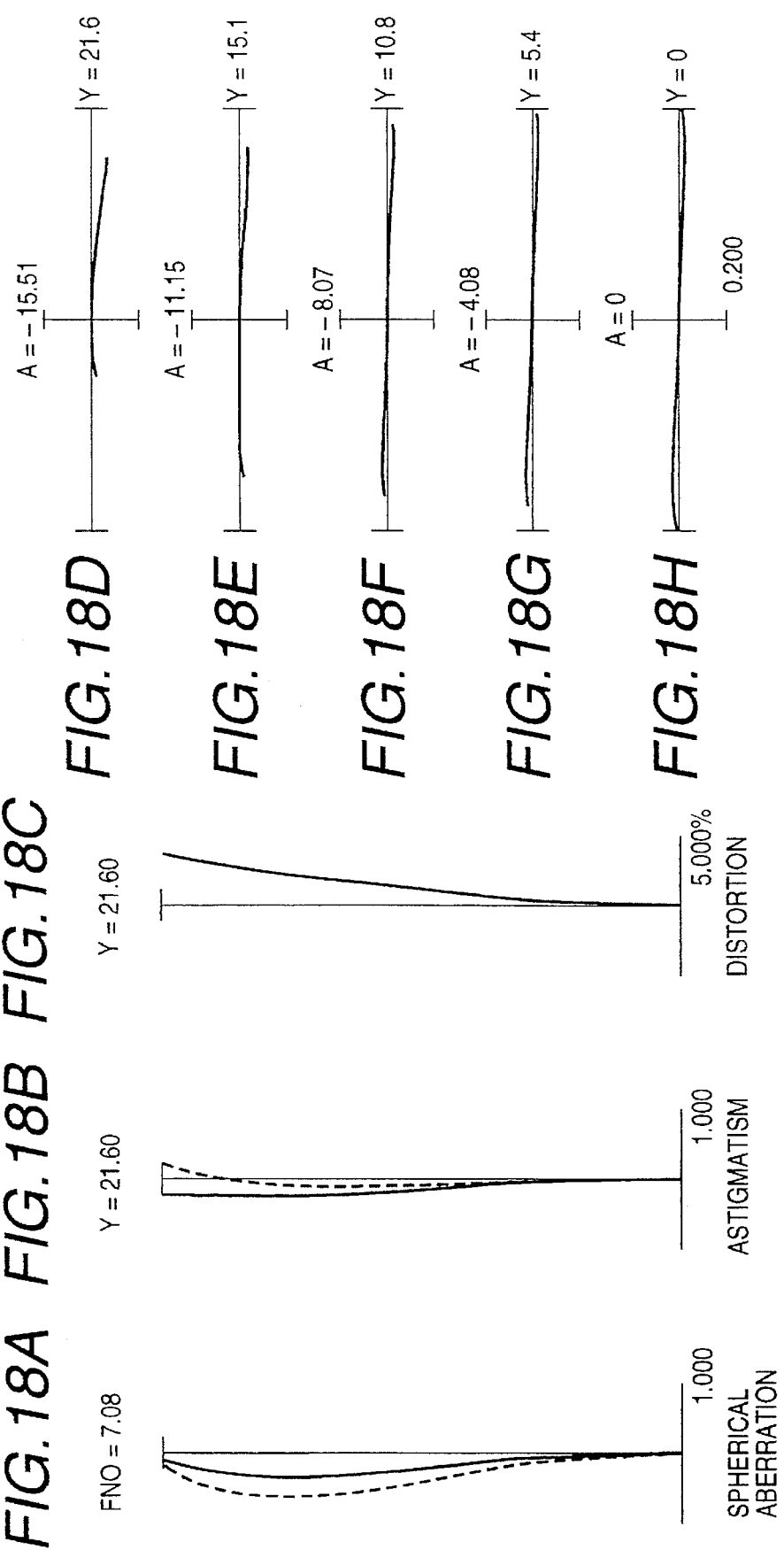

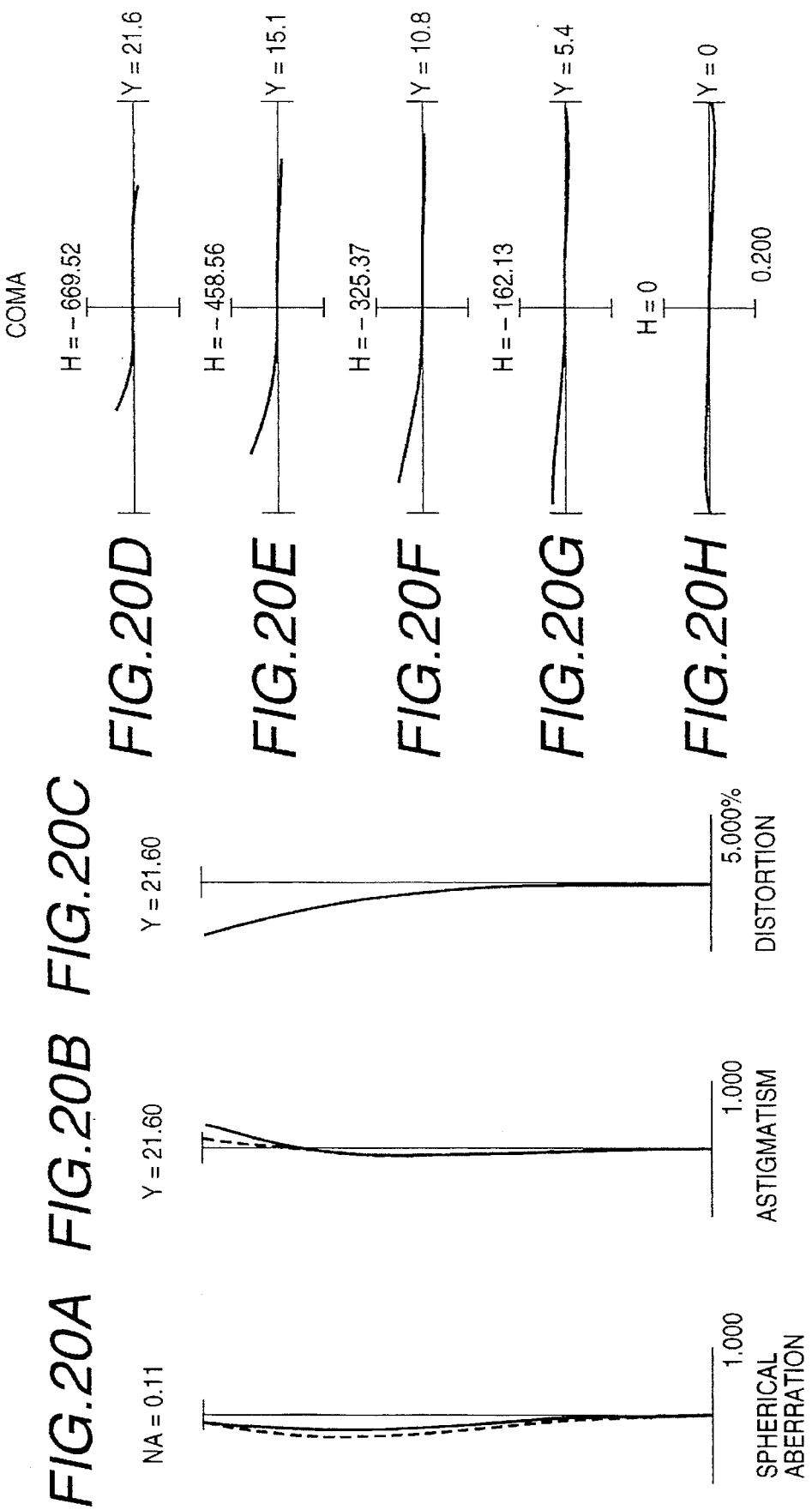

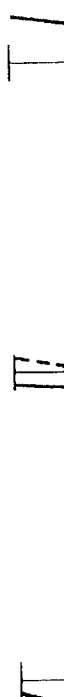

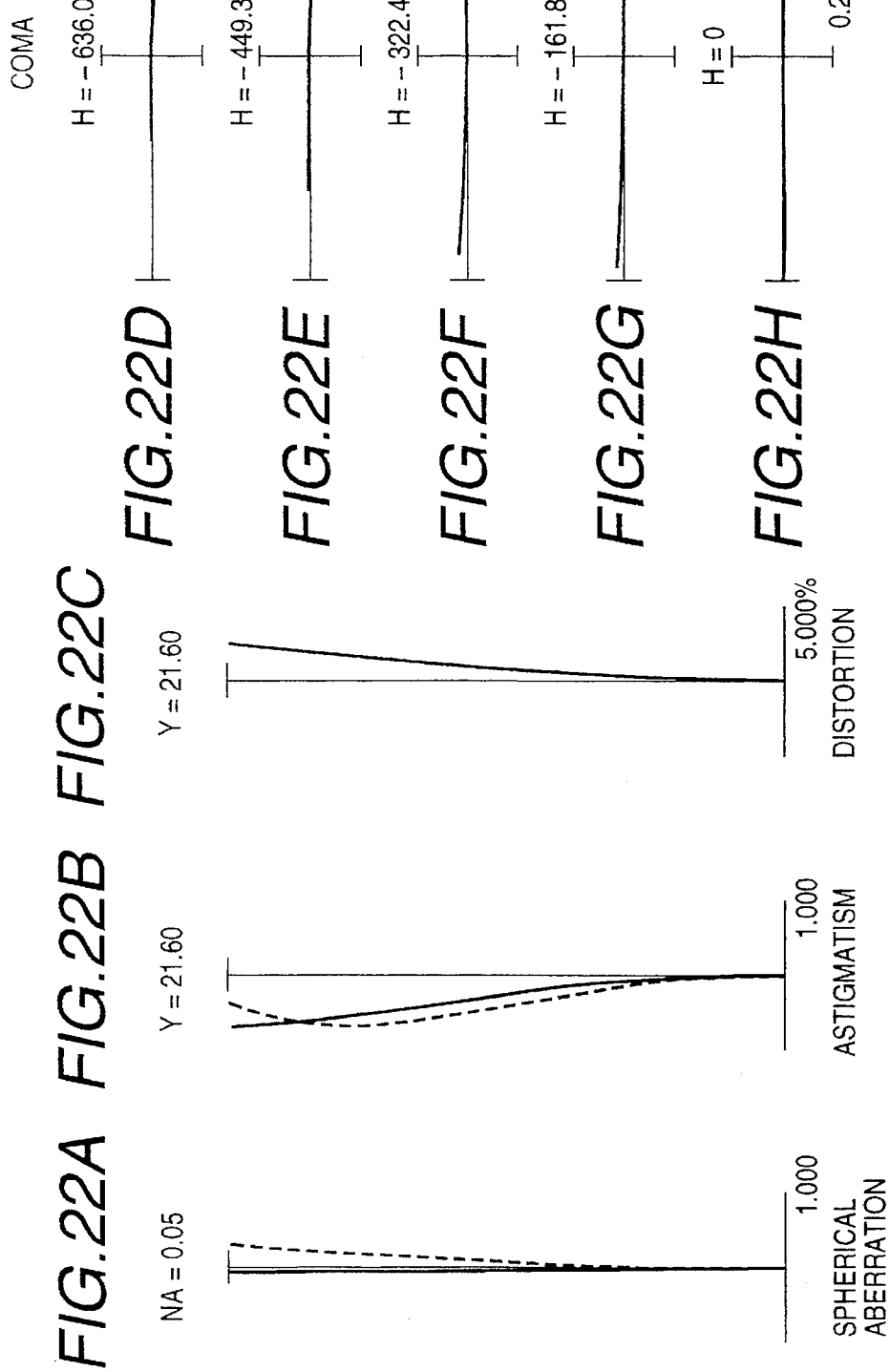

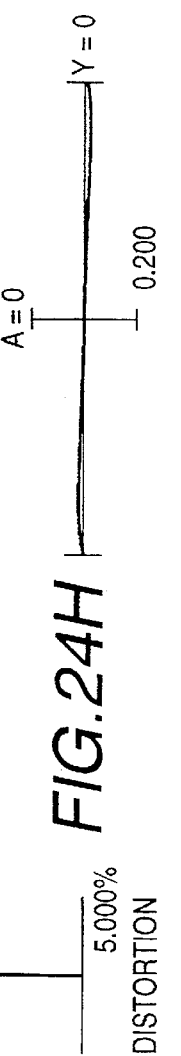

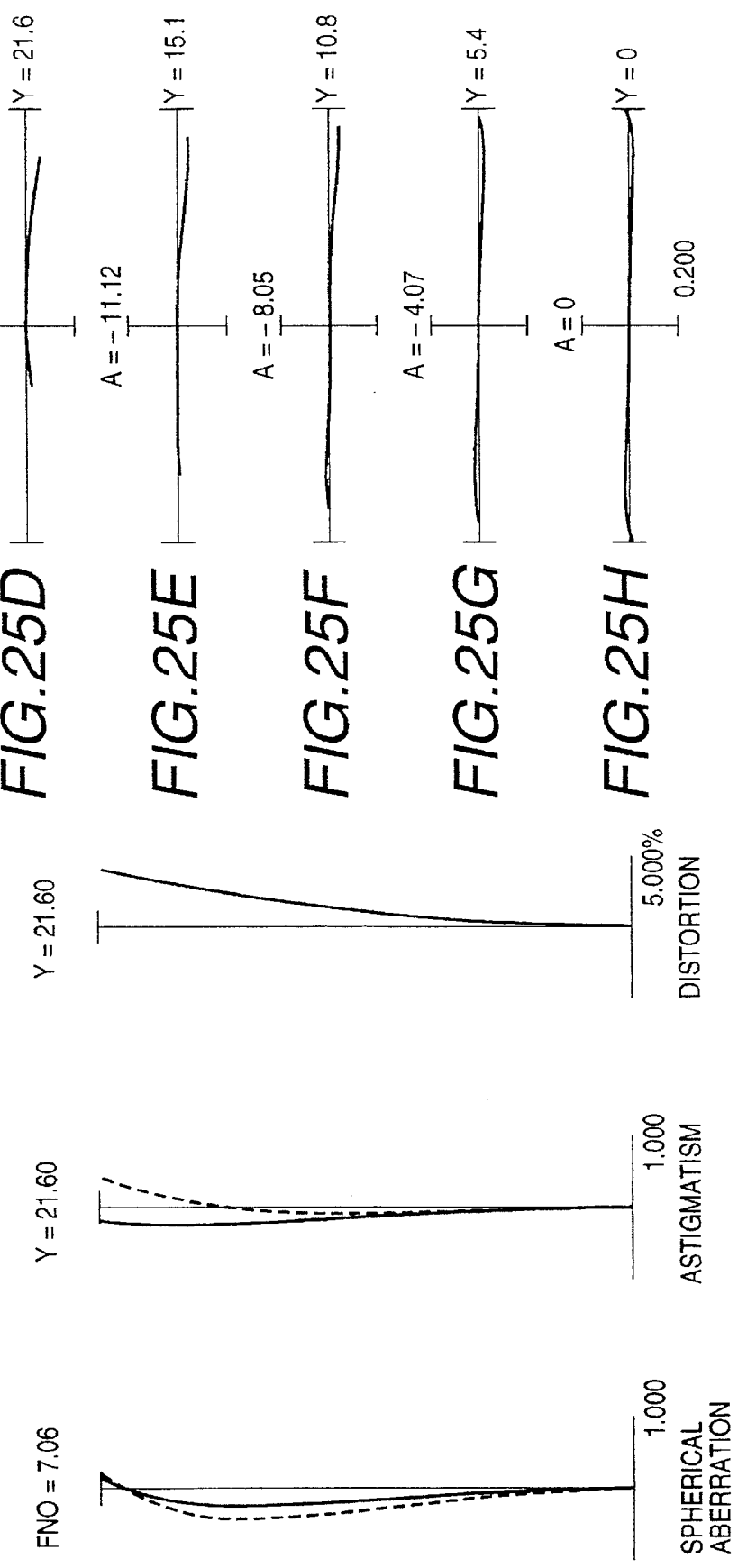

FIG.26A FIG.26B FIG.26C FIG.26D FIG.26E FIG.26F FIG.26G FIG.26H

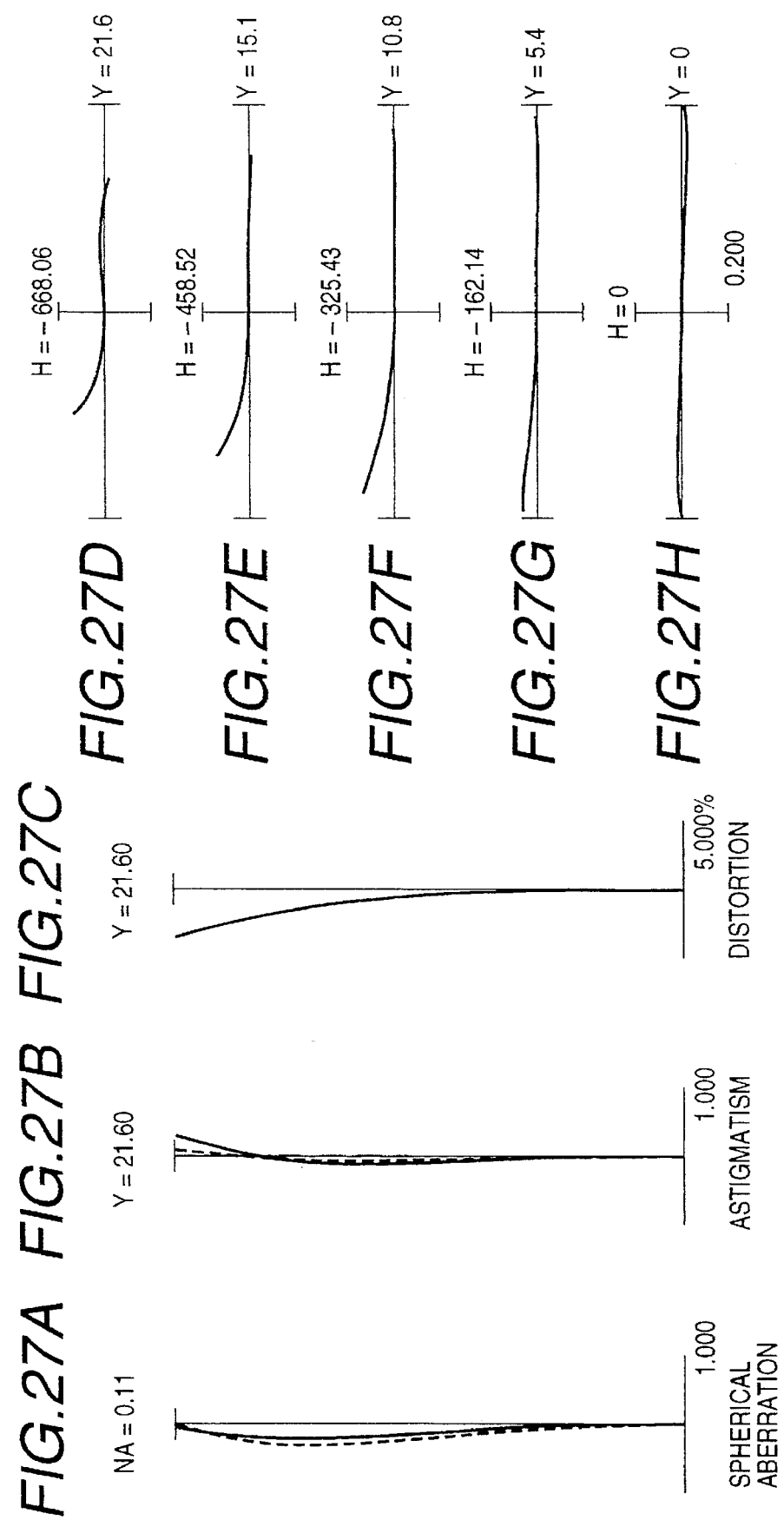

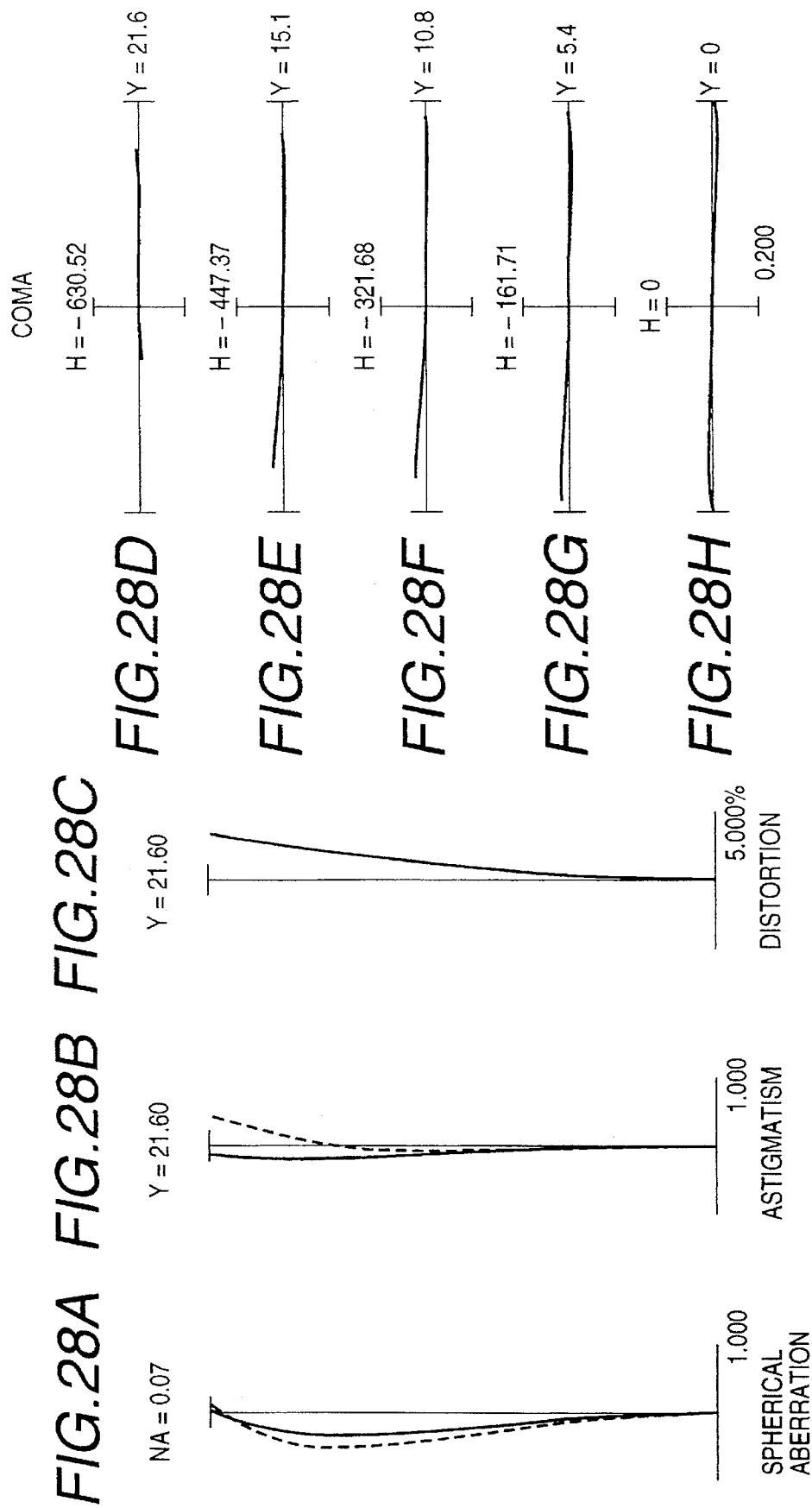

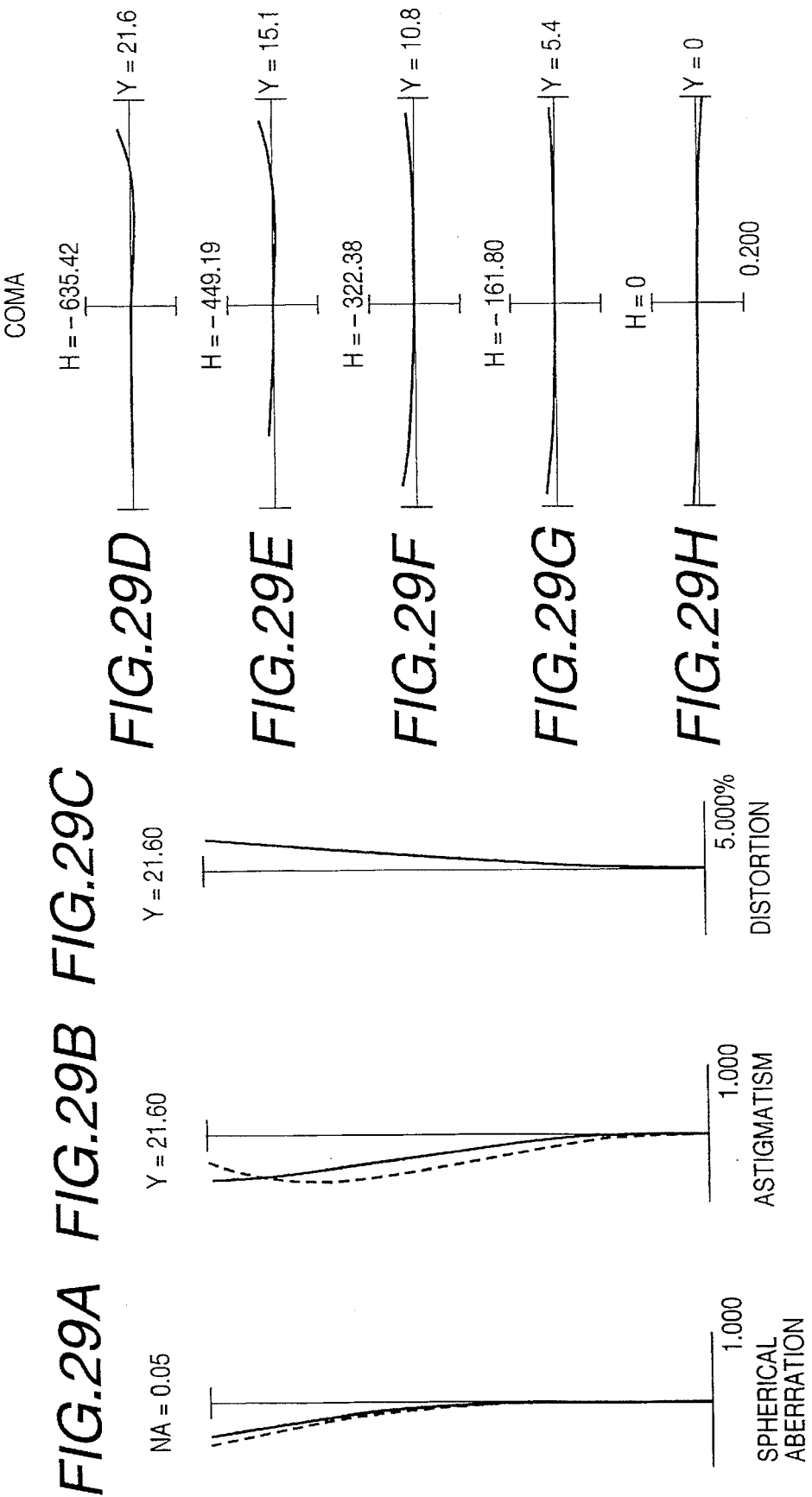

FIG.31A  FIG.31B  FIG.31C  FIG.31D  FIG.31E  FIG.31F  FIG.31G  FIG.31H

FNO = 4.52

Y = 21.60

Y = 21.60

Y = 21.6, A = -28.99

Y = 15.1, A = -21.16

Y = 10.8, A = -15.46

Y = 5.4, A = -7.88

Y = 0, A = 0

SPHERICAL ABERRATION

ASTIGMATISM

DISTORTION

COMA 1.000

1.000

5.000%

0.200

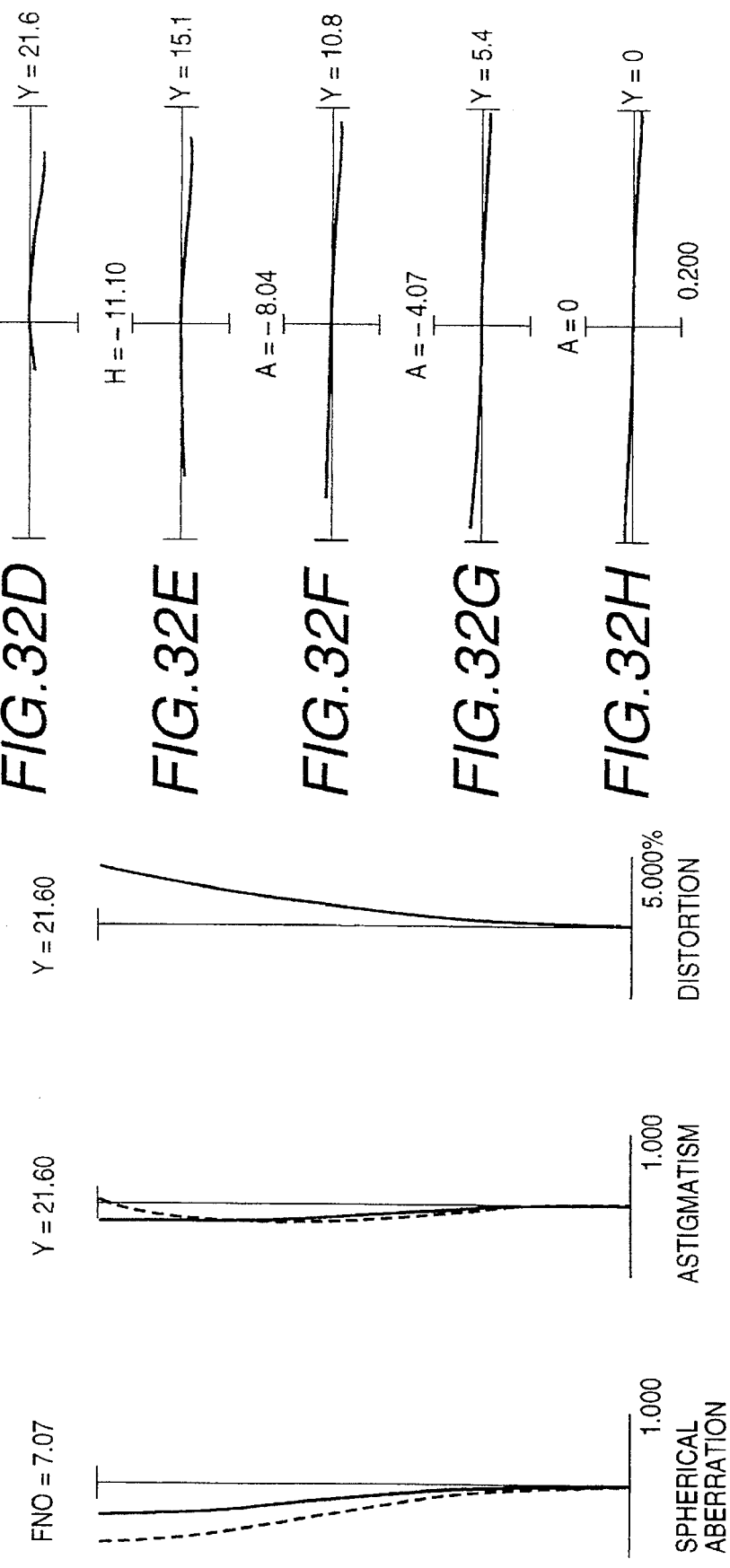

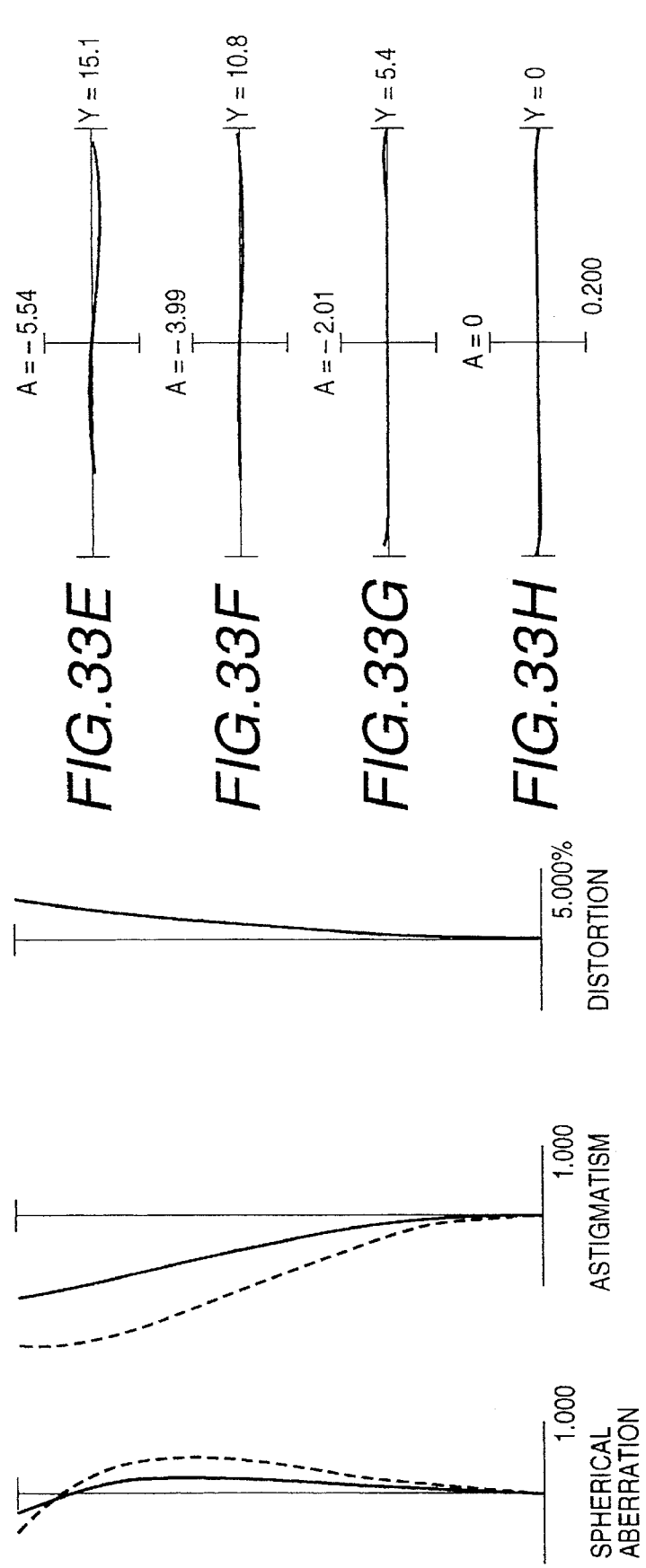

FIG.34A  FIG.34B  FIG.34C  FIG.34D  FIG.34E  FIG.34F  FIG.34G  FIG.34H

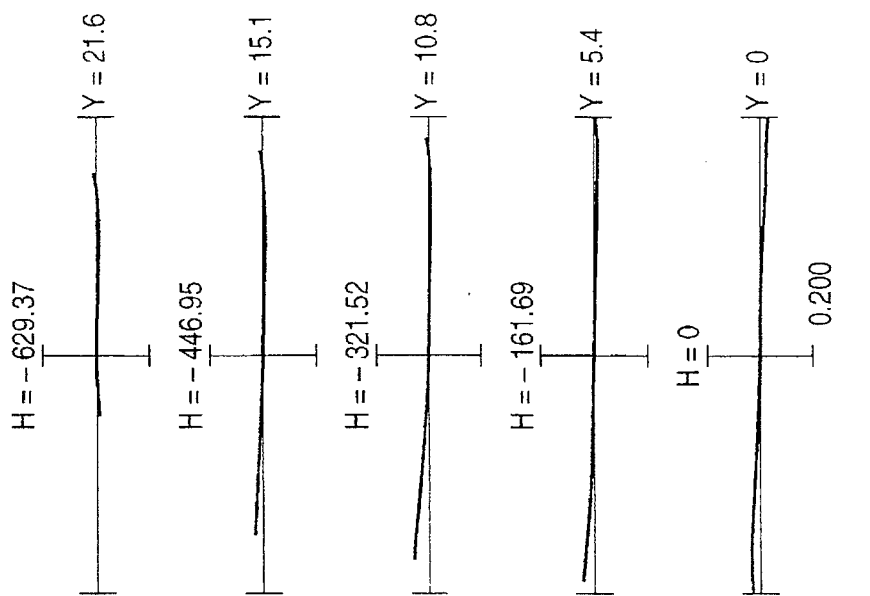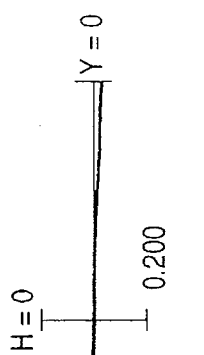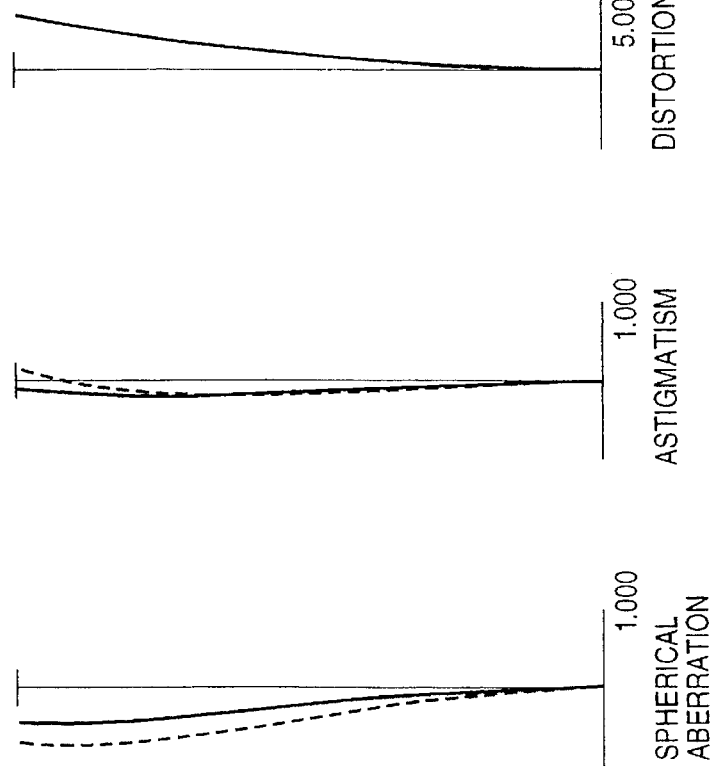

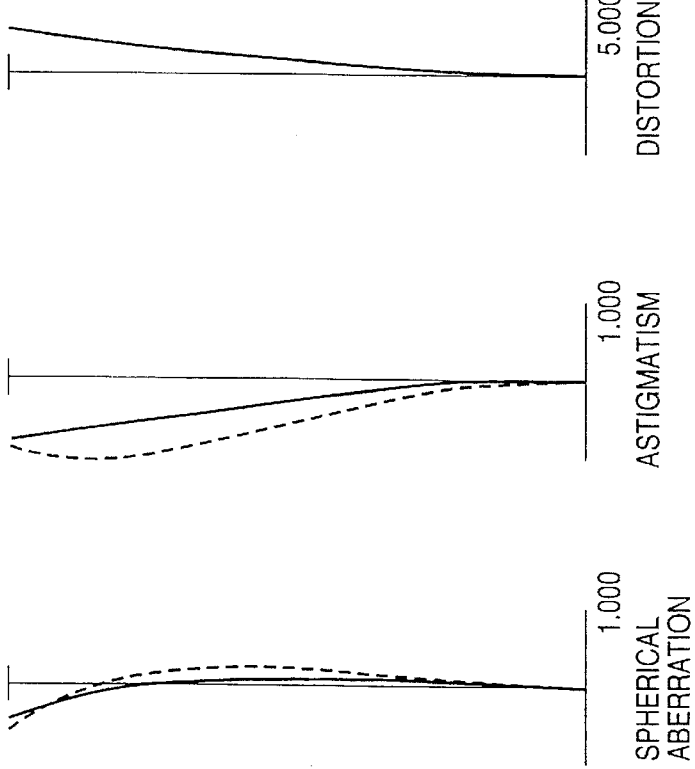

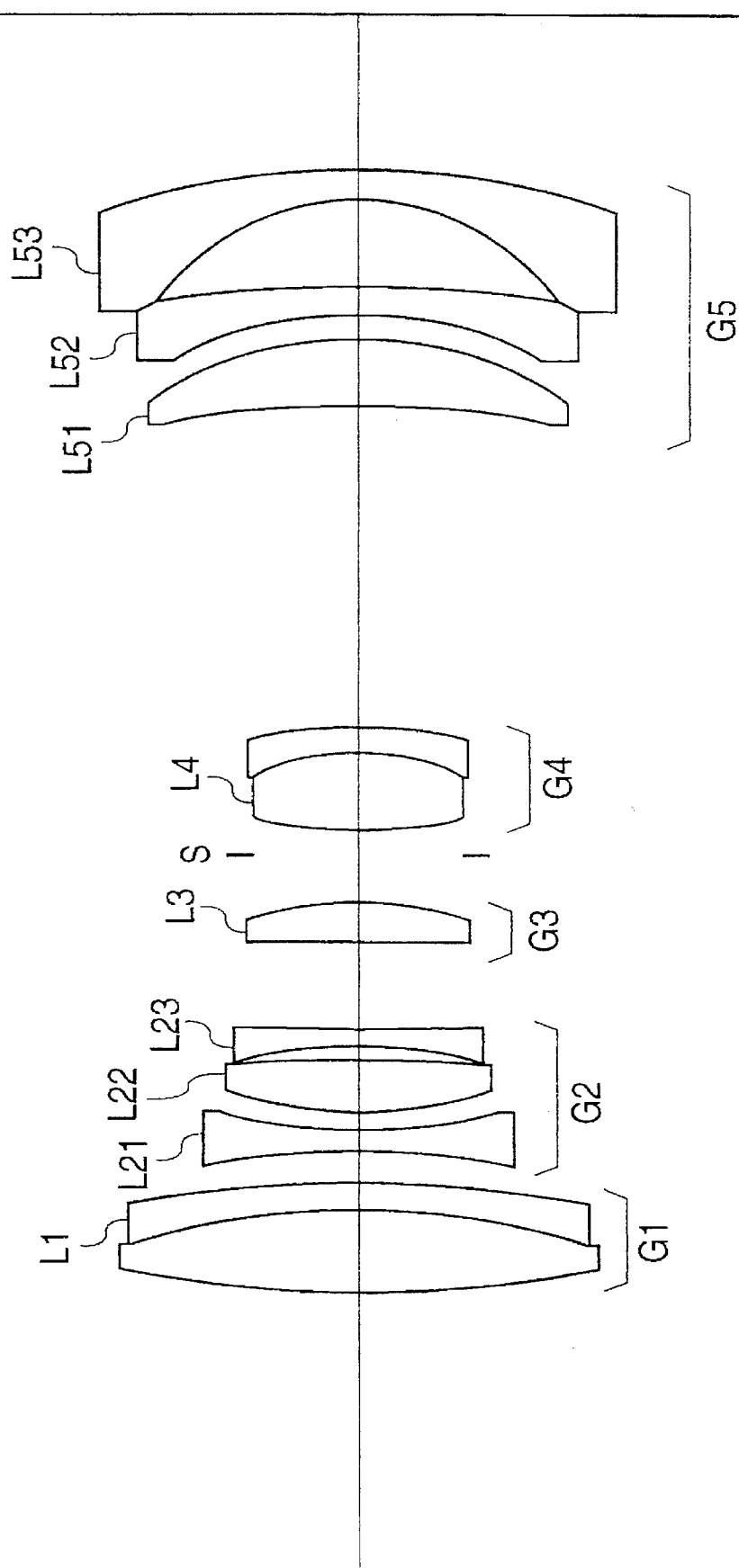

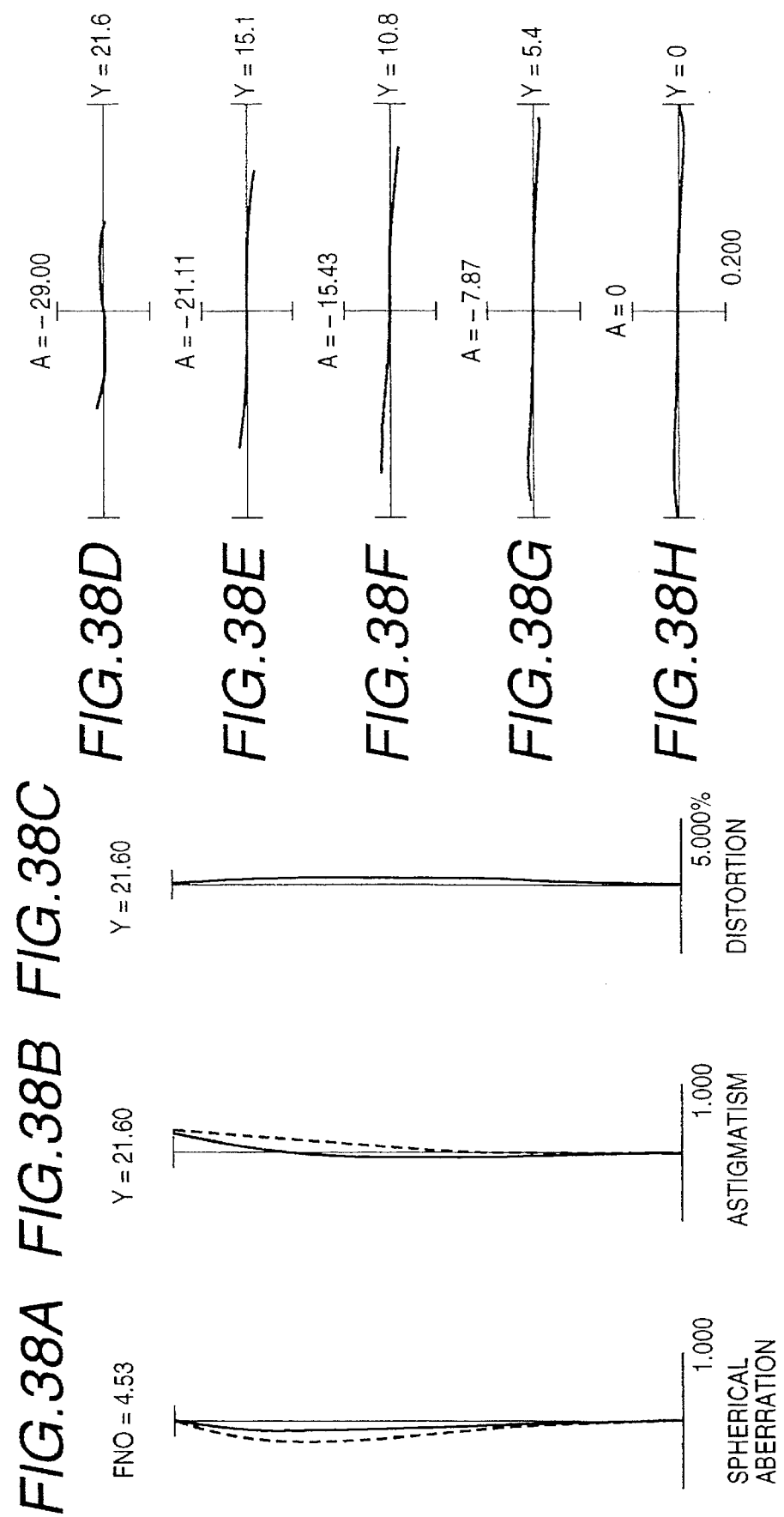

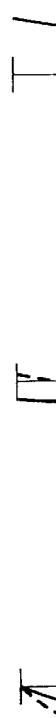
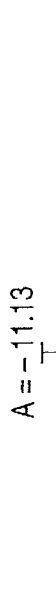

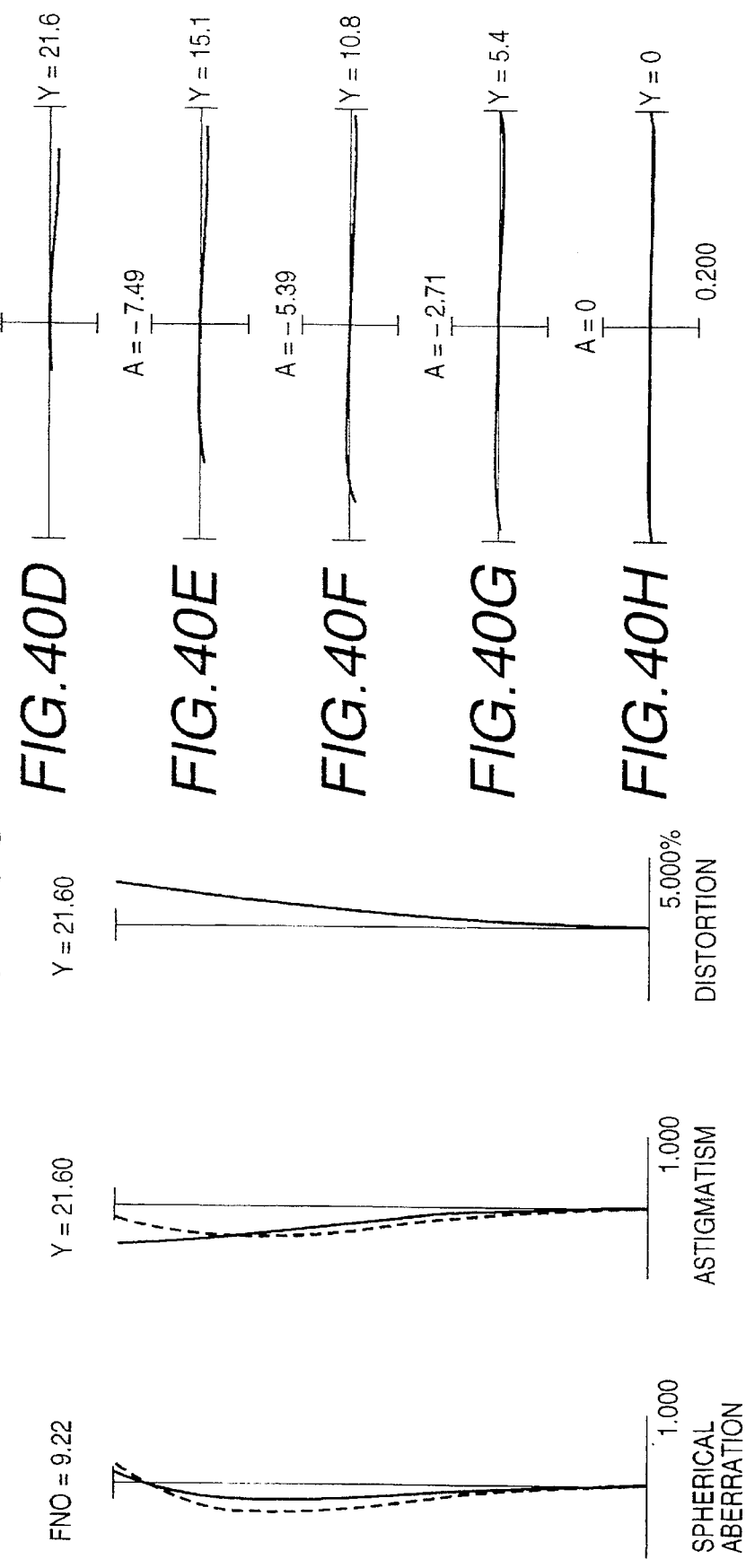

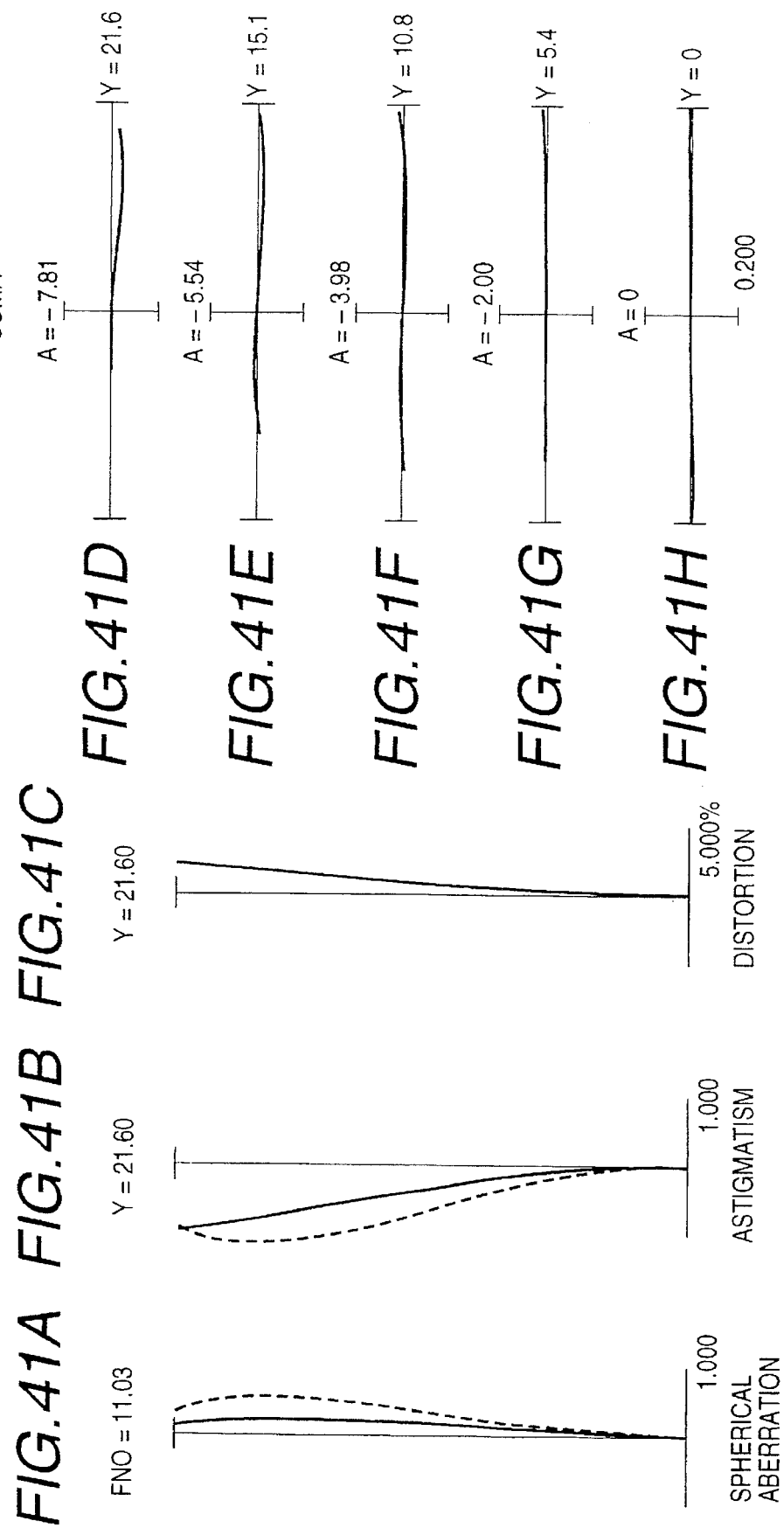

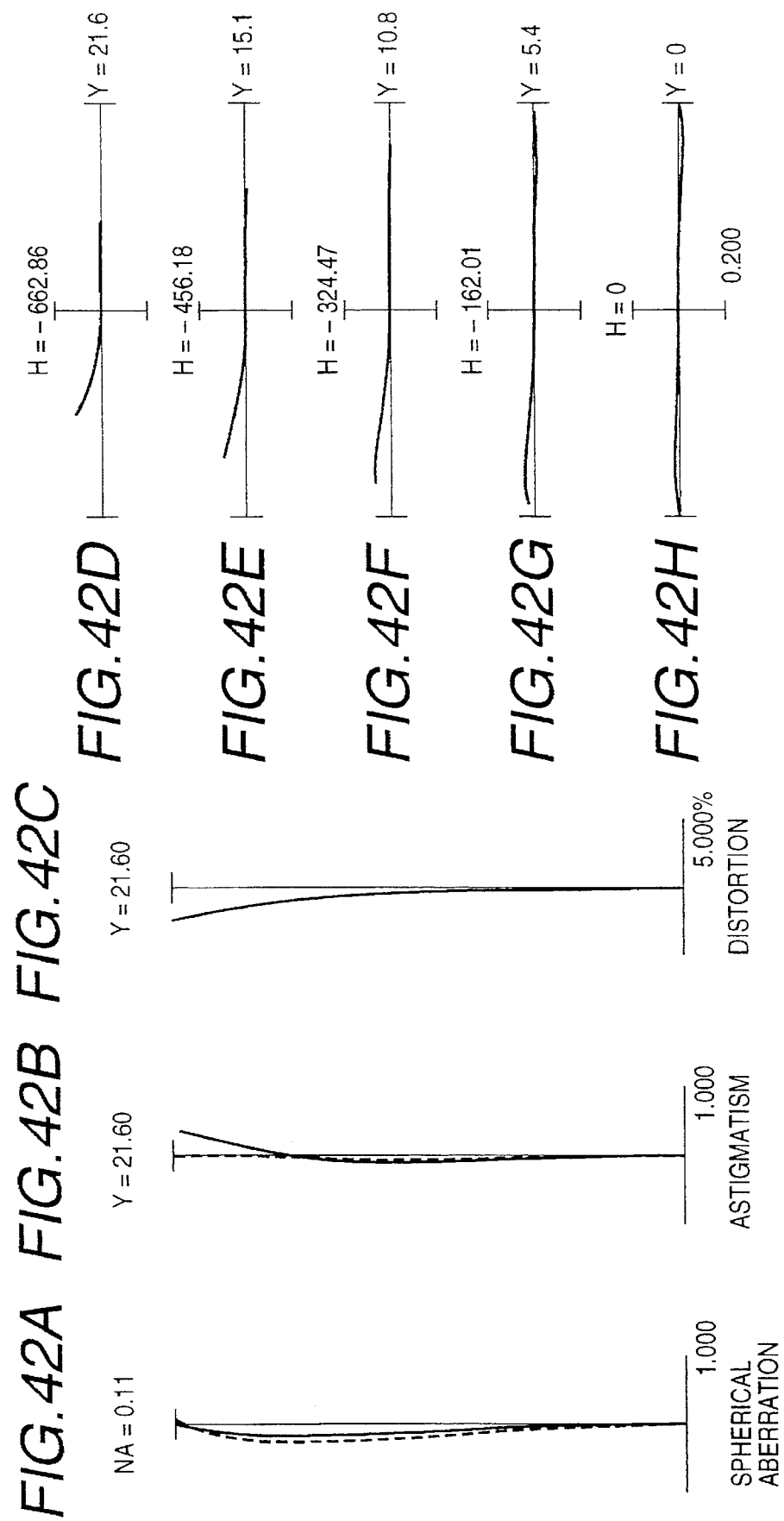

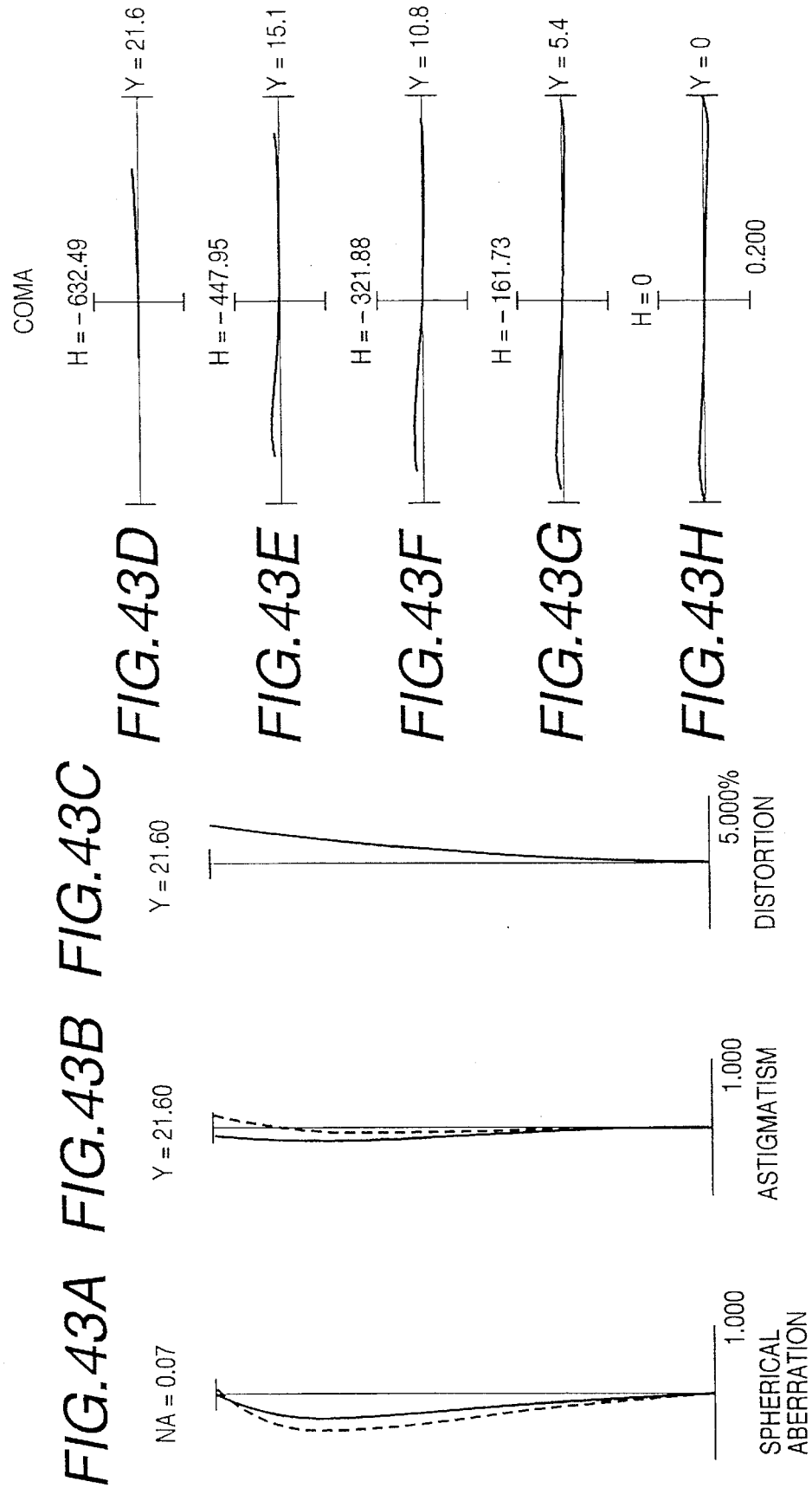

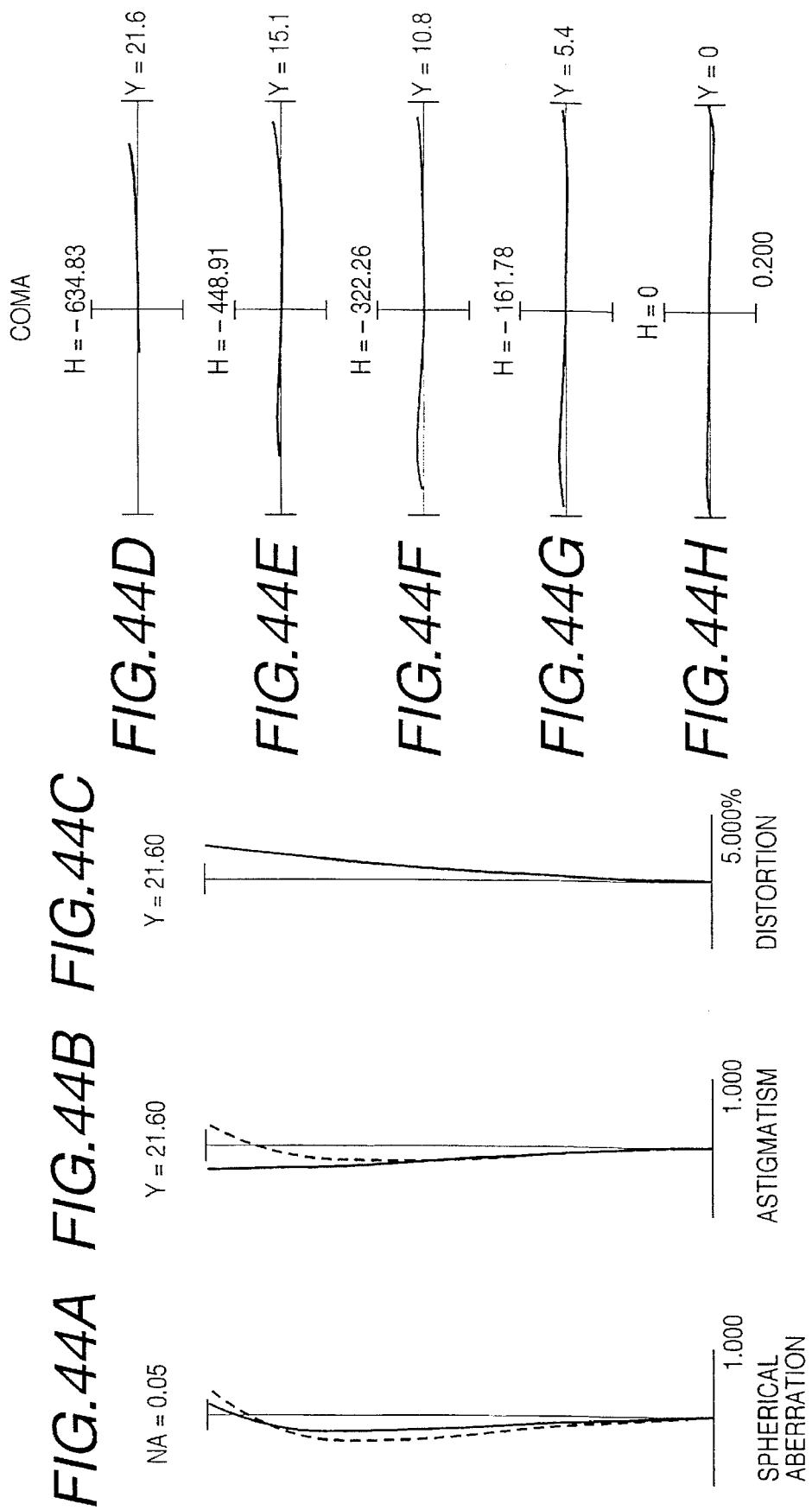

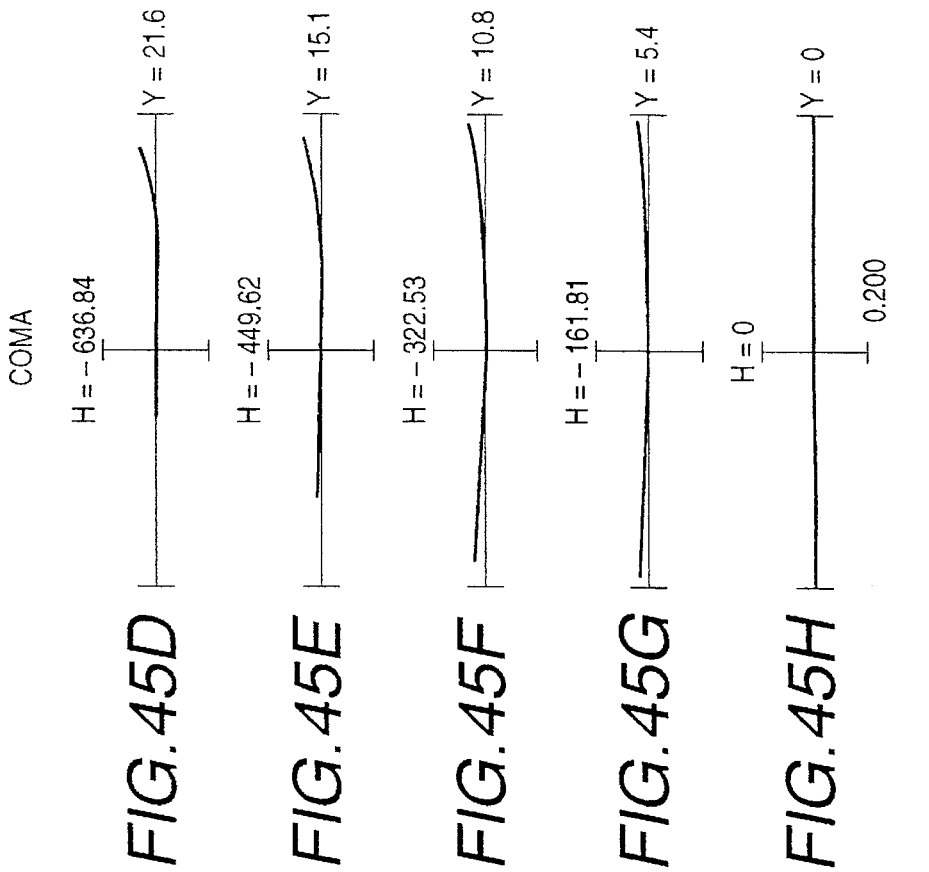

VARIABLE FOCAL LENGTH OPTICAL SYSTEM

BACKGROUND OF THE INVENTION

1. Field of the Invention

The present invention relates to a variable focal length optical system and, more particularly, to a compact variable focal length optical system which can achieve a high zoom ratio and whose total lens length in a maximum telephoto state (largest focal length state) is small.

2. Related Background Art

In recent years, cameras each having a zoom lens have become popular as lens shutter type cameras. Particularly, cameras each having a so-called high variable magnification zoom lens with a zoom ratio of 3× or more have become popular.

For a lens shutter type camera, even when the zoom power ratio of a taking lens is high, the camera is required to be compact and lightweight. Therefore, it is important to develop a lens system suitable for reducing the size of the lens system or the total length of the lens.

Unlike a single-lens reflex camera, the lens shutter type camera has no limitation in the back focus of the taking lens system. Therefore, in many taking lens systems, a negative lens unit is arranged in the lens system to be closest to the image, thereby reducing the lens diameter or the total lens length. In a maximum wide-angle state (smallest focal length state), when the back focus is decreased, and an off-axis light flux passing through the negative lens unit is separated from the optical axis in accordance with a change in field angle, an on-axis aberration and an off-axis aberration are independently corrected. The back focus is increased when an operation for changing the state of lens positions from the maximum wide-angle state to the maximum telephoto state is performed. With this arrangement, the height of the off-axis light flux passing through the negative lens unit is changed in accordance with the operation for changing the state of lens positions to suppress a variation in off-axis aberration caused by the operation for changing the state of lens positions, thereby obtaining satisfactory imaging performance.

Conventionally, as a zoom lens having a zoom ratio of about 2×, a positive/negative two-unit type zoom lens is popularly used, which comprises a positive lens unit and a negative lens unit in this order from the object side and moves each lens unit to change the distance between the positive lens unit and the negative lens unit in an operation for changing the state of lens positions.

In this positive/negative two-unit type zoom lens, only the second lens unit has a large change in lateral magnification with respect to a change in focal length of the entire lens system when the lens position state changes from the maximum wide-angle state to the maximum telephoto state. When a zoom ratio of 2× or more is to be realized, a change in lateral magnification of the second lens unit, which is caused by the operation for changing the state of lens positions, becomes large. Therefore, the variation in off-axis aberration generated in the operation for changing the state of lens positions cannot be satisfactorily corrected.

In the maximum wide-angle state, the refractive power arrangement is a large asymmetry. To correct a positive distortion, the first lens unit is constituted by a negative lens and a positive lens. Consequently, the total lens length can hardly be decreased in the maximum telephoto state.

Therefore, various proposals have been made for a zoom lens which uses a so-called multi-unit zoom lens constituted by three or more movable lenses to decrease a large change in lateral magnification of each lens unit with respect to a change in focal length of the entire lens system when the lens position state changes from the maximum wide-angle state to the maximum telephoto state and to achieve a high zoom ratio or size reduction. These proposals are disclosed in, e.g., Japanese Laid-Open Patent Application No. 6-265788 and Japanese Laid-Open Patent Application No. 7-27979 filed by the present applicant.

The zoom lens disclosed in Japanese Laid-Open Patent Application No. 6-265788 comprises, in the following order from the object side, a first lens unit having a positive refractive power, a second lens unit having a negative refractive power, a third lens unit having a positive refractive power, and a fourth lens unit having a negative refractive power. The zoom lens disclosed in Japanese Laid-Open Patent Application No. 7-27979 comprises, in the following order from the object side, a first lens unit having a positive refractive power, a second lens unit having a negative refractive power, a third lens unit having a positive refractive power, a fourth lens unit having a positive refractive power, and a fifth lens unit having a negative refractive power. In both the lens systems, a negative lens unit is arranged to be closest to the image, and all lens units move to the object side in the operation for changing the state of lens positions from the maximum wide-angle state to the maximum telephoto state.

In the zoom lens disclosed in Japanese Laid-Open Patent Application No. 6-265788, however, the fourth lens unit has a small change in lateral magnification with respect to a change in focal length of the entire lens system when the lens position state changes from the maximum wide-angle state to the maximum telephoto state while the second lens unit has a very large change in lateral magnification with respect to a change in focal length of the entire lens system when the lens position state changes from the maximum wide-angle state to the maximum telephoto state. As a result, the angle of incidence of the off-axis light flux passing through the second lens unit largely changes in zooming although the height of the off-axis light flux merely changes. Therefore, a variation in off-axis aberration generated in the operation for changing the state of lens positions can hardly be suppressed.

When a lot of aspherical surfaces are used, an aberration can be corrected within a limited focal length range such as in the maximum wide-angle state, the intermediate focal length state, or the maximum telephoto state. However, a variation in off-axis aberration can hardly be suppressed within the entire focal length range from the maximum wide-angle state to the maximum telephoto state.

From another viewpoint, though the technique of manufacturing an aspherical lens is advanced today, the performance may be largely degraded by an eccentricity generated in manufacturing when too many aspherical lenses are used. In addition, the contrast of a high spatial frequency component is lowered by an error in plane precision with respect to the design value, which is generated in manufacturing. Therefore, the zoom lens disclosed in Japanese Laid-Open Patent Application No. 6-265788 cannot sufficiently satisfy high performance.

In the zoom lens disclosed in Japanese Laid-Open Patent Application No. 7-27979, the focal length of the first lens unit is large relative to that of the entire system in the maximum telephoto state, and the converging action is small. Therefore, this zoom lens is not so suitable for reducing the total lens length.

SUMMARY OF THE INVENTION

The present invention has been made in consideration of the above problems, and has as its object to provide a compact variable focal length optical system which can achieve a high variable ratio and whose total lens length in a maximum telephoto state is small.

In order to solve the above problems, according to the present invention, there is provided a variable focal length optical system comprising: a first lens unit (G1) having a positive refractive power and arranged to be closest to an object; a final lens unit (Gb) having a negative refractive power and arranged to be closest to an image, the first lens unit (G1) and the final lens unit (Gb) moving to the object side when a focal length of an entire lens system changes from a smallest focal length state to a largest focal length state; and an aperture stop arranged on the image side of the first lens unit (G1) and on the object side of the final lens unit (Gb), wherein the system satisfies the following conditions:

$$0.25 < |fb|/f1 < 0.45$$

$$0.7 < M1/f1 < 0.9$$

$$0.4 < |fb|/Mb < 0.5$$

$$D/fw < 0.7$$

where f1 is the focal length of the first lens unit (G1), fb is the focal length of the final lens unit (Gb), M1 is the moving amount of the first lens unit (G1) to the object side, which is obtained when the focal length of the entire lens system changes from the smallest focal length state to the largest focal length state, Mb is the moving amount of the final lens unit (Gb) to the object side, which is obtained when the focal length of the entire lens system changes from the smallest focal length state to the largest focal length state, D is the distance along an optical axis between a surface of the lens system, which is closest to the object, and the aperture stop in the smallest focal length state, and fw is the focal length of the entire lens system in the smallest focal length state.

In this case, preferably, this system further comprises a second lens unit (G2) having a negative refractive power and arranged adjacent to the image side of the first lens unit (G1), the second lens unit (G2) having, in the following order from the object side, a biconcave lens (L21), a positive lens (L22) with a convex surface facing the object side, and a negative lens (L23) with a concave surface facing the object side, and the system satisfies the following condition:

$$0.03 < D23/|r23| < 0.07$$

where D23 is the air gap along the optical axis between the biconcave lens (L21) and the positive lens (L22), and r23 is the radius of curvature of the object-side surface of the negative lens (L23).

The above and other objects, features and advantages of the present invention will be explained hereinafter and may be better understood by reference to the drawings and the descriptive matter which follows.

BRIEF DESCRIPTION OF THE DRAWINGS

FIGS. 3A to 3H are graphs showing various aberrations in an infinite focus state in the maximum wide-angle state of the first embodiment;

FIGS. 4A to 4H are graphs showing various aberrations in the infinite focus state in the intermediate focal length state of the first embodiment;

Figures 5A, 5B, 5C, 5D, 5E, 5F, 5G, 5H:
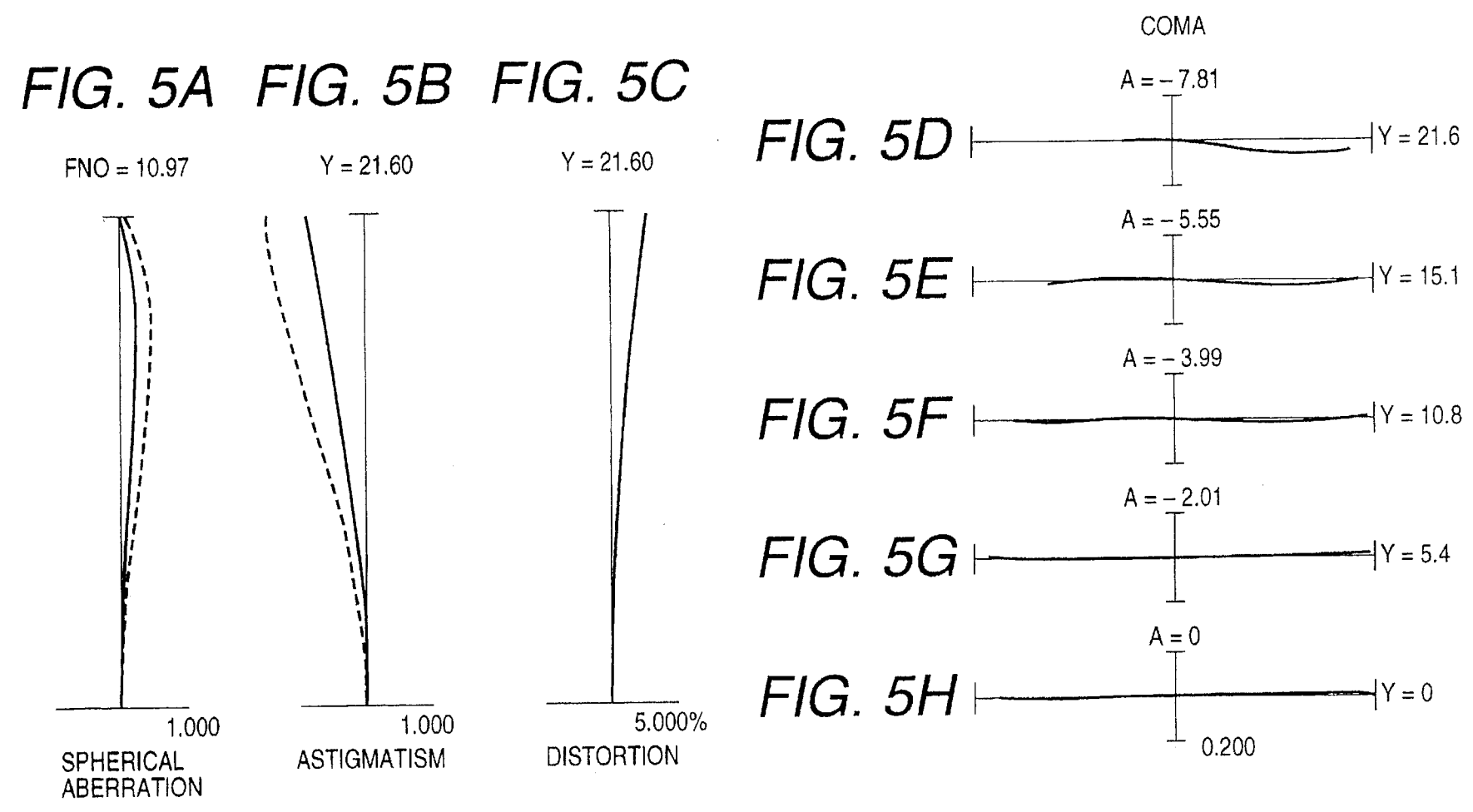

FIGS. 5A to 5H are graphs showing various aberrations in the infinite focus state in the maximum telephoto state of the first embodiment;

FIGS. 6A to 6H are graphs showing various aberrations at a phototaking magnification of 1/30× in the maximum wide-angle state of the first embodiment;

FIGS. 7A to 7H are graphs showing various aberrations at a phototaking magnification of 1/30× in the intermediate focal length state of the first embodiment;

FIGS. 8A to 8H are graphs showing various aberrations at a phototaking magnification of 1/30× in the maximum telephoto state of the first embodiment;

FIGS. 10A to 10H are graphs showing various aberrations in an infinite focus state in the maximum wide-angle state of the second embodiment;

Figures 11A, 11B, 11C, 11D, 11E, 11F, 11G, 11H:
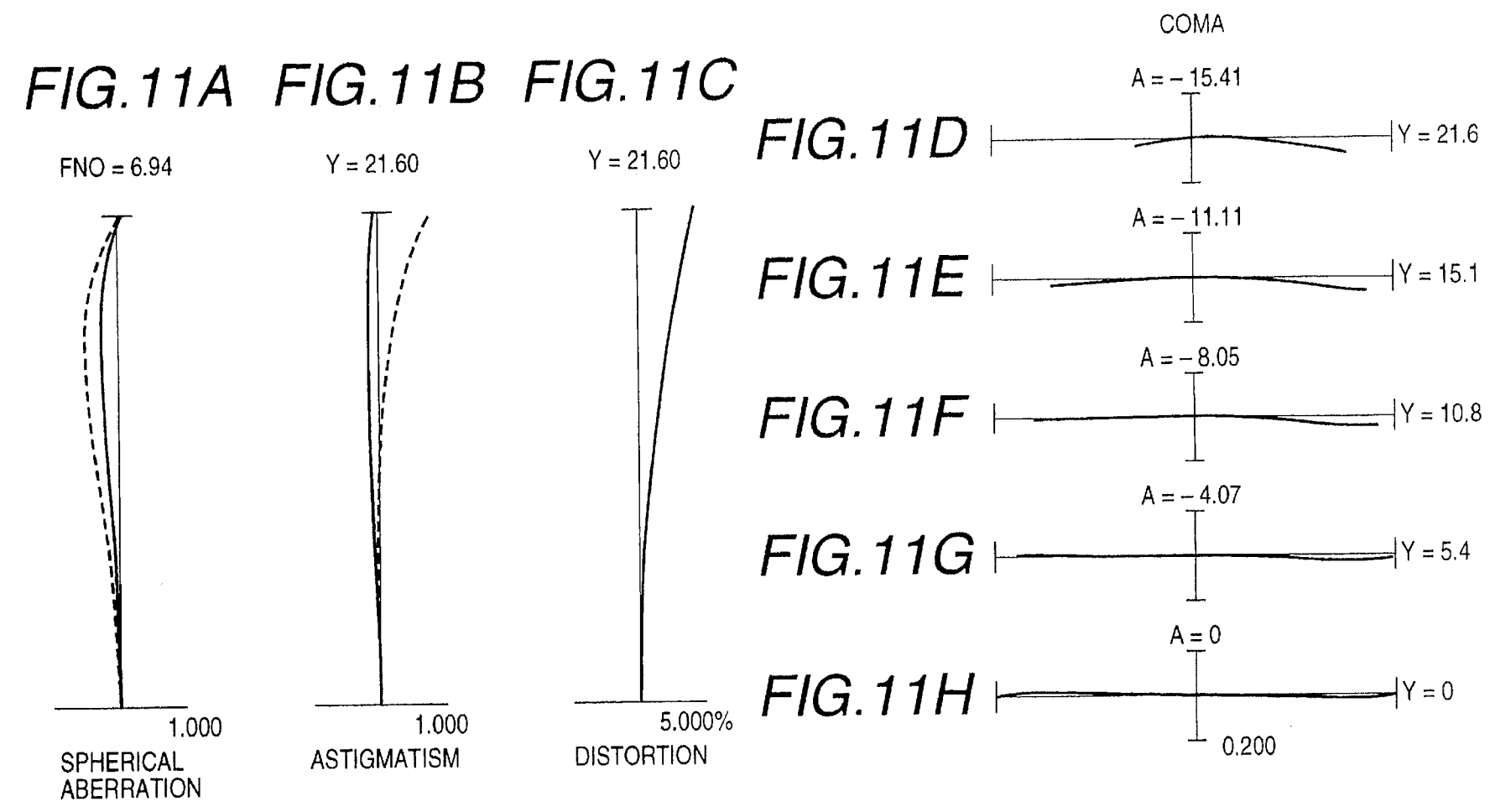

FIGS. 11A to 11H are graphs showing various aberrations in the infinite focus state in the intermediate focal length state of the second embodiment;

FIGS. 12A to 12H are graphs showing various aberrations in the infinite focus state in the maximum telephoto state of the second embodiment;

FIGS. 13A to 13H are graphs showing various aberrations at a phototaking magnification of 1/30× in the maximum wide-angle state of the second embodiment;

FIGS. 14A to 14H are graphs showing various aberrations at a phototaking magnification of 1/30× in the intermediate focal length state of the second embodiment;

FIGS. 15A to 15H are graphs showing various aberrations at a phototaking magnification of 1/30× in the maximum telephoto state of the second embodiment;

FIG. 16 is a view showing the lens arrangement of a variable focal length optical system according to the third embodiment of the present invention;

FIGS. 17A to 17H are graphs showing various aberrations in an infinite focus state in the maximum wide-angle state of the third embodiment;

FIGS. 18A to 18H are graphs showing various aberrations in the infinite focus state in the intermediate focal length state of the third embodiment;

FIGS. 20A to 20H are graphs showing various aberrations at a phototaking magnification of 1/30× in the maximum wide-angle state of the third embodiment;

FIGS. 21A to 21H are graphs showing various aberrations at a phototaking magnification of 1/30× in the intermediate focal length state of the third embodiment;

FIGS. 22A to 22H are graphs showing various aberrations at a phototaking magnification of 1/30× in the maximum telephoto state of the third embodiment;

FIGS. 24A to 24H are graphs showing various aberrations in an infinite focus state in the maximum wide-angle state of the fourth embodiment;

FIGS. 25A to 25H are graphs showing various aberrations in the infinite focus state in the intermediate focal length state of the fourth embodiment;

Figures 26A, 26B, 26C, 26D, 26E, 26F, 26G, 26H:
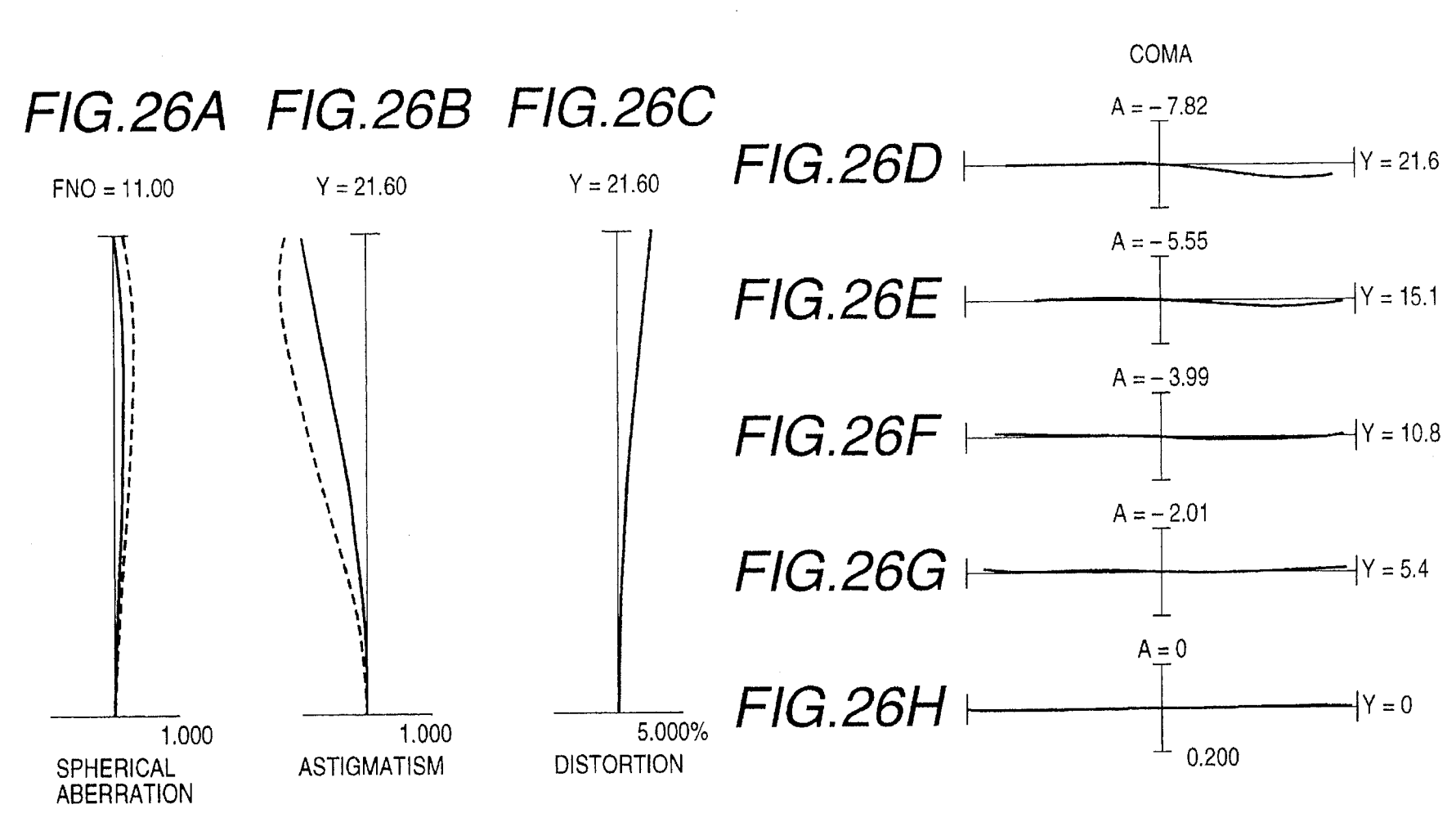

FIGS. 26A to 26H are graphs showing various aberrations in the infinite focus state in the maximum telephoto state of the fourth embodiment;

FIGS. 27A to 27H are graphs showing various aberrations at a phototaking magnification of 1/30× in the maximum wide-angle state of the fourth embodiment;

FIGS. 28A to 28H are graphs showing various aberrations at a phototaking magnification of 1/30× in the intermediate focal length state of the fourth embodiment;

FIGS. 29A to 29H are graphs showing various aberrations at a phototaking magnification of 1/30× in the maximum telephoto state of the fourth embodiment;

FIGS. 31A to 31H are graphs showing various aberrations in an infinite focus state in the maximum wide-angle state of the fifth embodiment;

FIGS. 32A to 32H are graphs showing various aberrations in the infinite focus state in the intermediate focal length state of the fifth embodiment;

FIGS. 33A to 33H are graphs showing various aberrations in the infinite focus state in the maximum telephoto state of the fifth embodiment;

Figures 34A, 34B, 34C, 34D, 34E, 34F, 34G, 34H:
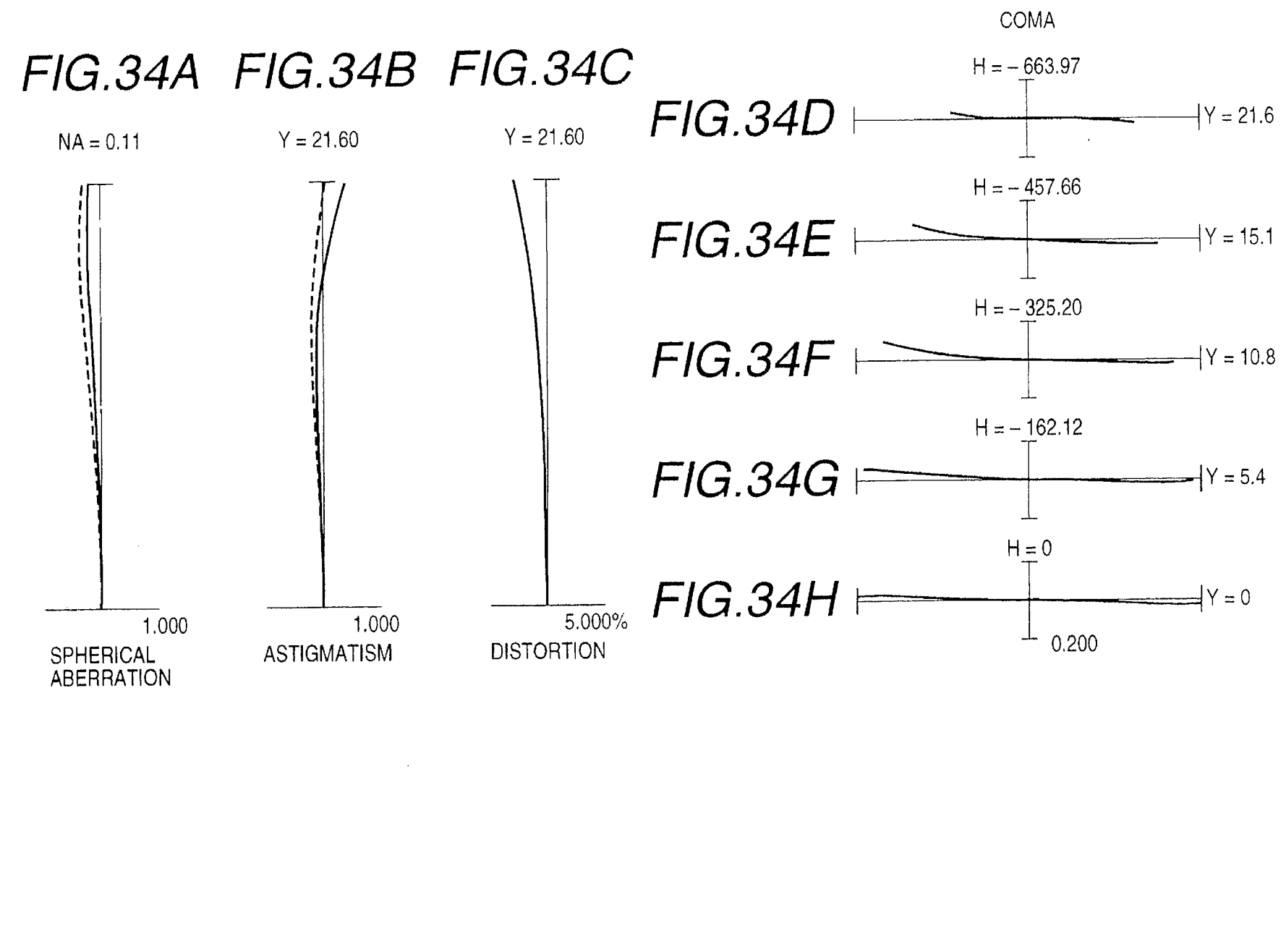

FIGS. 34A to 34H are graphs showing various aberrations at a phototaking magnification of 1/30× in the maximum wide-angle state of the fifth embodiment;

FIGS. 35A to 35H are graphs showing various aberrations at a phototaking magnification of 1/30× in the intermediate focal length state of the fifth embodiment;

FIGS. 36A to 36H are graphs showing various aberrations at a phototaking magnification of 1/30× in the maximum telephoto state of the fifth embodiment;

FIG. 37 is a view showing the lens arrangement of a variable focal length optical system according to the sixth embodiment of the present invention;

FIGS. 38A to 38H are graphs showing various aberrations in an infinite focus state in the maximum wide-angle state of the sixth embodiment;

FIGS. 39A to 39H are graphs showing various aberrations in the infinite focus state in the first intermediate focal length state of the sixth embodiment;

FIGS. 40A to 40H are graphs showing various aberrations in the infinite focus state in the second intermediate focal length state of the sixth embodiment;

FIGS. 41A to 41H are graphs showing various aberrations in the infinite focus state in the maximum telephoto state of the sixth embodiment;

FIGS. 42A to 42H are graphs showing various aberrations at a phototaking magnification of 1/30× in the maximum wide-angle state of the sixth embodiment;

FIGS. 43A to 43H are graphs showing various aberrations at a phototaking magnification of 1/30× in the first intermediate focal length state of the sixth embodiment;

FIGS. 44A to 44H are graphs showing various aberrations at a phototaking magnification of 1/30× in the second intermediate focal length state of the sixth embodiment; and FIGS. 45A to 45H are graphs showing various aberrations at a phototaking magnification of 1/30× in the maximum telephoto state of the sixth embodiment.

DETAILED DESCRIPTION OF THE PREFERRED EMBODIMENTS

Figure 1:
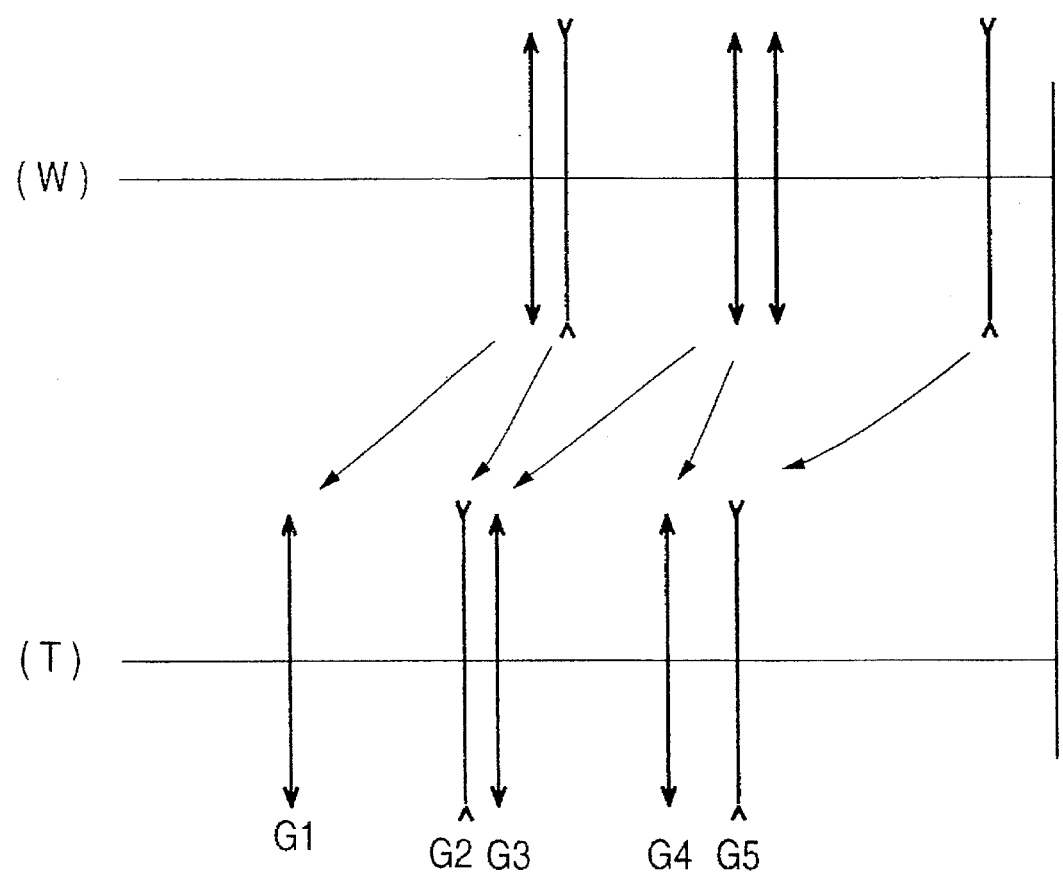
FIG. 1 is a view showing the refractive power arrangement of a variable focal length optical system according to each embodiment of the present invention, and the movement of each lens unit in an operation for changing the state of lens positions from a maximum wide-angle state (W) to a maximum telephoto state (T)

Reduction of the total lens length in a maximum telephoto state will be described first.

Zoom lenses are classified into positive front type zoom lenses in which a positive lens unit is arranged to be closest to the object and negative front type zoom lenses in which a negative lens unit is arranged to be closest to the object.

Generally, a negative front type zoom lens is advantageously used to obtain a wide field angle, though it is not suitable for reducing the total lens length. On the other hand, as positive front type zoom lenses, positive/negative/positive/positive type zoom lenses and positive/negative/positive/negative type zoom lenses are known well.

For a positive/negative/positive/positive type zoom lens, a lateral magnification $\beta 2$ of the second lens unit having a negative refractive power is set as $-1<\beta 2<0$ to increase the refractive power. With this arrangement, an off-axis light flux passing through the first lens unit in the maximum wide-angle state is made close to the optical axis. As a result, reduction of the lens diameter is achieved, and an operation for changing the state of lens positions from the wide-angle range to the telephoto range including the standard range is enabled. However, since the refractive power arrangement in the maximum telephoto state is not of a telephoto type, the total lens length in the maximum telephoto state cannot be made smaller than the focal length of the entire lens system.

For a positive/negative/positive/negative type zoom lens, the lateral magnification $\beta 2$ of the second lens unit having a negative refractive power is set as $1<|\beta 2|$ to relax the refractive power. With this arrangement, the total lens length in the maximum telephoto state can be reduced. However, when a wide field angle is to be achieved, the off-axis light flux passing through the first lens unit is extremely separated from the optical axis, resulting in a difficulty in reduction of the lens diameter.

As for the positive/negative/positive/negative type zoom lens including the wide-angle range, like the one disclosed in the above-described Japanese Laid-Open Patent Application No. 6-265788, the lateral magnification $\beta 2$ of the second lens unit is represented as $1>|\beta 2|$ in the maximum wide-angle state. However, since the lateral magnification of the second lens unit largely changes in the operation for changing the state of lens positions, a variation in off-axis aberration generated in the second lens unit in the operation for changing the state of lens positions cannot be suppressed. In addition, since the distance along the optical axis from the aperture stop to the surface closest to the object is large in the maximum wide-angle state, the lens diameter cannot be reduced.

The functions of the respective lens units constituting the variable focal length optical system according to the present invention will be described below.

Like the conventional zoom lens having a multi-unit structure, in the present invention as well, a final lens unit Gb as a negative lens unit is arranged in the lens system to be closest to the image. When the back focus is decreased in the smallest focal length state (maximum wide-angle state), the height of the off-axis light flux passing through the final lens unit Gb is changed in accordance with the field angle, thereby independently correcting the on-axis aberration and the off-axis aberration.

However, when the back focus is extremely decreased, the off-axis light flux passing through the final lens unit Gb is too far from the optical axis, so the lens diameter cannot be reduced. In addition, dust tends to adhere on the lens surface closest to the image. When the back focus is too small, dust adhering on the lens surface is undesirably shot on the film. Therefore, it is important to set the back focus at an appropriate value in the maximum wide-angle state.

To the contrary, in the largest focal length state (maximum telephoto state), the back focus is increased. More specifically, when the focal length of the lens system changes from the smallest focal length state to the largest focal length state, the final lens unit Gb is moved to the object side. In this manner, in the largest focal length state, the height of the off-axis light flux passing through the final lens unit Gb becomes closer to the optical axis than that in the smallest focal length state such that a variation in off-axis aberration generated in changing the focal length of the lens system is minimized.

In the present invention, to obtain the wide field angle and reduce the total lens length in the maximum telephoto state, the lens system comprises, in the following order from the object side, a first lens unit G1 having a positive refractive power, a second lens unit G2 having a negative refractive power, a plurality of positive lens units which change air gaps therebetween when the focal length of the lens system changes, and the final lens unit Gb having a negative refractive power and arranged to be closest to the image. This lens system satisfies the following five conditions (i) to (v).

(i) As in a general positive front type zoom lens, when the focal length of the lens system changes from the maximum wide-angle state to the maximum telephoto state, the first lens unit G1 is moved to the object side such that the air gap between the first lens unit G1 and the second lens unit G2 increases.

(ii) The refractive power of the second lens unit G2 is a strong negative refractive power, and the lateral magnification $\beta 2$ of the second lens unit G2 is set as $-1 < \beta 2 < 0$.

(iii) The final lens unit Gb is arranged to be closest to the image. When the focal length of the lens system changes from the maximum wide-angle state to the maximum telephoto state, the final lens unit Gb is moved to the object side such that the gap between the final lens unit Gb and the lens unit arranged adjacent to the object side of the final lens unit Gb decreases.

(iv) The synthesized refractive power of the plurality of positive lens units arranged on the image side of the second lens unit G2 is a strong positive refractive power. When the focal length of the lens system changes from the maximum wide-angle state to the maximum telephoto state, the air gaps between the plurality of positive lens units are changed such that the synthesized refractive power as a positive refractive power is weakened.

(v) An aperture stop is arranged near the center of the lens system.

In the present invention, the first lens unit G1 having a positive refractive power is close to the second lens unit G2 having a negative refractive power in the maximum wide-angle state. With this arrangement, the off-axis light flux passing through the first lens unit G1 is made close to the optical axis. In addition, the synthesized refractive power of the first lens unit G1 and the second lens unit G2 is set as a strong negative refractive power. Consequently, the refractive power arrangement becomes close to that of a symmetry type, so that a distortion can be prevented, or an appropriate back focus can be obtained to reduce the lens diameter or correct an off-axis aberration. To the contrary, when the focal length of the entire lens system changes from the maximum wide-angle state to the maximum telephoto state, the gap between the first lens unit G1 and the second lens unit G2 is increased. With this arrangement, the refractive power arrangement of the entire lens system is shifted to that of a telephoto type, thereby achieving reduction of the total lens length.

More specifically, when, in the maximum wide-angle state, the off-axis light flux passing through the first lens unit G1, the second lens unit G2, and the final lens unit Gb approaches the optical axis, the total lens length of the entire lens system becomes larger than the focal length of the entire lens system. In the maximum telephoto state, when the total lens length becomes smaller than the focal length of the entire lens system, size reduction of the lens system is achieved. Particularly, when the first lens unit G1 is moved to the object side as the focal length of the entire lens system changes from the maximum wide-angle state to the maximum telephoto state, the height of the off-axis light flux passing through the first lens unit G1 is prevented from being extremely separated from the optical axis. Therefore, condition (i) is necessary.

As described above, in the maximum wide-angle state, the first lens unit G1 having a positive refractive power is close to the second lens unit G2 such that the synthesized refractive power becomes a strong negative refractive power. With this arrangement, a sufficient back focus can be obtained. Therefore, condition (ii) is necessary.

Conventionally, in a lens system having no limitation on the back focus, like a lens shutter type zoom lens, when the focal length of the entire lens system changes from the maximum wide-angle state to the maximum telephoto state, the final lens unit Gb is moved to the object side such that the gap between the principal point of the entire lens units arranged on the object side of the final lens unit Gb and the final lens unit Gb is decreased. With this arrangement, the final lens unit Gb is used for multiplication, so that a variation in off-axis aberration caused by the operation for changing the state of lens positions is satisfactorily suppressed, and a zooming function is effectively obtained. This also applies to the present invention, and condition (iii) is necessary.

Particularly, in a three-unit type zoom lens such as a Positive/positive/negative type zoom lens, the negative lens unit closest to the image has the largest change in lateral magnification with respect to a change in focal length of the entire lens system when the lens position state changes from the maximum wide-angle state to the maximum telephoto state. However, in the present invention, the zooming action of the final lens unit Gb relative to the operation for changing the state of lens positions of the entire lens system is decreased, thereby achieving both the high zoom ratio and high performance.

The reason for this is as follows. If the lateral magnification of one of the lens units largely changes when the focal length of the entire lens system changes from the maximum wide-angle state to the maximum telephoto state, variations in various aberrations caused by the operation for changing the state of lens positions become large, so high performance cannot be achieved. In addition, as for the final lens unit Gb, the lateral magnification is larger than 1 in the maximum wide-angle state and becomes very large in the maximum telephoto state. Therefore, when a predetermined zoom ratio is to be obtained, the focal position is shifted from the film surface by only a fine movement of the final lens unit Gb, resulting in a difficulty in control and manufacturing.

The telephoto ratio is known as one of indices for reduction of the total lens length. The telephoto ratio is a value obtained by dividing the total lens length by the focal length of the entire lens system. To reduce the telephoto ratio, the refractive power of the positive lens unit arranged on the object side, the refractive power of the negative lens unit arranged on the image side, and the gap between the principal points of these two lens units must be appropriately set.

In the present invention, the converging effect of the positive lens system including the plurality of positive lens units arranged on the image side of the second lens unit G2 is weaker in the maximum wide-angle state than that in the maximum telephoto state. More specifically, the synthesized positive refractive power of the positive portion lens system is weakened, and the synthesized refractive power from the second lens unit G2 to the final lens unit Gb is set as a negative refractive power, thereby achieving a refractive power arrangement of a telephoto type and a telephoto ratio of 1 or less.

In the maximum wide-angle state, the refractive power arrangement is constituted by the negative portion lens system comprising the first lens unit G1 and the second lens unit G2, the positive portion lens system including the plurality of positive lens units, and the final lens unit Gb. Unless the positive portion lens system has a strong positive refractive power, a predetermined focal length cannot be obtained. Hence, the positive refractive power of the positive portion lens system is made stronger in the maximum wide-angle state than that in the maximum telephoto state. For this reason, condition (iv) is important.

In the present invention, to reduce the lens diameter of each lens unit, an aperture stop is preferably arranged near the center of the lens system on the image side of the first lens unit G1 and on the object side of the final lens unit Gb. In the operation for changing the state of lens positions, the aperture stop is preferably moved integrally with the movable lens unit or independently of the movable lens unit. Particularly, the aperture stop is preferably arranged on the image side of the second lens unit G2. Therefore, condition (v) is necessary.

In the present invention, instead of decreasing a large change in lateral magnification of the final lens unit Gb closest to the image with respect to a change in focal length of the entire lens system when the lens position state changes from the maximum wide-angle state to the maximum telephoto state, a large change in lateral magnification of the second lens unit G2 with respect to a change in focal length of the entire lens system when the lens position state changes from the maximum wide-angle state to the maximum telephoto state is increased to some extent, thereby realizing a high zoom ratio. In addition, the second lens unit G2 comprises, in the following order from the object side, a biconcave lens having a strong negative refractive power, a biconvex lens, and a negative lens with its concave surface facing the object side. With this arrangement, the variation in off-axis aberration generated in the second lens unit G2 in the operation for changing the state of lens positions is satisfactorily corrected.

Of the above-described lenses constituting the second lens unit G2, the biconcave lens arranged on the object side is formed using a glass material with a high refractive index such that the off-axis aberration generated when an off-axis light flux passes through the biconcave lens in the maximum wide-angle state can be suppressed, and a sufficient back focus can be obtained. In addition, the refractive power of the image-side lens surface is stronger than that of the object-side lens surface. With this arrangement, an on-axis aberration is satisfactorily corrected by the air gap formed between the biconvex lens and the negative lens.

The conditional formulas of the present invention will be described below.

The present invention satisfies the following conditional formulas (1) to (4):

$$0.25 < |fb|/f1 < 0.45 \quad (1)$$

$$0.7 < M1/f1 < 0.9 \quad (2)$$

$$0.4 < |fb|/Mb < 0.5 \quad (3)$$

$$D/fw < 0.7 \quad (4)$$

where f1: the focal length of the first lens unit G1 fb: the focal length of the final lens unit Gb

M1: the moving amount of the first lens unit G1 to the object side, which is obtained when the focal length of the entire lens system changes from the smallest focal length state to the largest focal length state Mb: the moving amount of the final lens unit Gb to the object side, which is obtained when the focal length of the entire lens system changes from the smallest focal length state to the largest focal length state D: the distance along the optical axis between the surface of the lens system, which is closest to the object, and the aperture stop in the smallest focal length state fw: the focal length of the entire lens system in the smallest focal length state Conditional formula (1) defines the ratio of the focal length of the final lens unit Gb arranged to be closest to the image to that of the first lens unit G1.

When |fb|/f1 of conditional formula (1) exceeds the upper limit value, the converging action of the first lens unit G1 increases, so that the total lens length can be reduced. However, in the maximum wide-angle state, no sufficient back focus can be obtained. In addition, shadow of the dust on the last surface is recorded.

To the contrary, when |fb|/f1 of conditional formula (1) is smaller than the lower limit value, the diverging action of the final lens unit Gb arranged to be closest to the image increases, so that an appropriate back focus can be obtained in the maximum wide-angle state. However, in the maximum telephoto state, the total lens length cannot be reduced.

Conditional formula (2) defines the ratio of the moving amount M1 of the first lens unit G1 in the operation for changing the state of lens positions to the focal length f1 of the first lens unit G1.

When M1/f1 of conditional formula (2) exceeds the upper limit value, the total lens length in the maximum telephoto state becomes too large.

On the other hand, when M1/f1 of conditional formula (2) is smaller than the lower limit value, the off-axis light flux passing through the first lens unit G1 is separated from the optical axis in the maximum wide-angle state. The effective diameter of the front lens cannot be reduced, so the object of the present invention, i.e., size reduction of the lens system cannot be achieved.

Conditional formula (3) defines the ratio of the focal length fb of the final lens unit Gb to the moving amount Mb of the final lens unit Gb in the operation for changing the state of lens positions.

When |fb|/Mb of conditional formula (3) exceeds the upper limit value, a large change in lateral magnification of the final lens unit Gb with respect to a change in focal length of the entire lens system when the lens position state changes from the maximum wide-angle state to the maximum telephoto state is decreased, so a uniform change in lateral magnification with respect to a change in focal length of the entire lens system when the lens position state changes from the maximum wide-angle state to the maximum telephoto state cannot be obtained. As a result, when a predetermined zoom ratio is to be obtained, variations in various aberrations caused by the operation for changing the state of lens positions cannot be satisfactorily suppressed.

To the contrary, when |fb|/Mb of conditional formula (3) is smaller than the lower limit value, the large change in lateral magnification of the final lens unit Gb with respect to a change in focal length of the entire lens system when the lens position state changes from the maximum wide-angle state to the maximum telephoto state becomes too large, so the variations in various aberrations generated in the final lens unit Gb in the operation for changing the state of lens positions cannot be satisfactorily corrected.

Conditional formula (4) defines the distance along the optical axis between the surface of the lens system, which is closest to the object, and the aperture stop in the maximum wide-angle state.

When D/fw of conditional formula (4) exceeds the upper limit value, the off-axis light flux passing through the surface closest to the object is separated from the optical axis in the maximum wide-angle state, so the lens diameter cannot be reduced.

To further improve the performance, preferably, the height of the off-axis light flux passing through the first lens unit G1 and the second lens unit G2 in the maximum wide-angle state is separated from the optical axis to some extent, thereby independently correcting the on-axis aberration and the off-axis aberration. That is, to further improve the performance, the lower limit value of conditional formula (4) is preferably set to be 0.5.

In the present invention, as described above, the second lens unit G2 having a negative refractive power is preferably arranged adjacent to the image side of the first lens unit G1 such that size reduction and high performance are achieved, and simultaneously an appropriate back focus is obtained in the maximum wide-angle state. In addition, to satisfactorily correct the variation in off-axis aberration generated in the second lens unit G2 in the operation for changing the state of lens positions, the second lens unit G2 preferably comprises three lenses, i.e., a biconcave lens L21, a positive lens L22 with its convex surface facing the object side, and a negative lens L23 with its concave surface facing the object side, and conditional formula (5) is preferably satisfied:

$$0.03 < D23/|r23| < 0.07 \qquad (5)$$

where

D23: the air gap along the optical axis between the biconcave lens L21 and the positive lens L22 r23: the radius of curvature of the object-side surface of the negative lens L23

Conditional formula (5) defines a condition for satisfactorily correcting the variation in off-axis aberration generated in the operation for changing the state of lens positions performed by only the second lens unit G2.

As described above, a change in lateral magnification of the second lens unit G2 with respect to a change in focal length of the entire lens system when the lens position state changes from the maximum wide-angle state to the maximum telephoto state is relatively large. Therefore, it is necessary to suppress various aberrations generated by only the second lens unit G2 and suppress the variations in various aberrations generated in the operation for changing the state of lens positions.

When D23/|r23| of conditional formula (5) exceeds the upper limit value, (i) the air gap along the optical axis between the biconcave lens L21 and the positive lens L22 may increase, or (ii) the radius of curvature of the object-side surface of the negative lens L23 may be close to zero.

When (i), i.e., the air gap along the optical axis between the biconcave lens L21 and the positive lens L22 increases, a sufficient back focus can be obtained in the maximum wide-angle state. However, the biconcave lens L21 and the positive lens L22 mutually weaken their refractive powers, and the off-axis light flux passing through the biconcave lens L21 is separated from the optical axis, the off-axis aberration cannot be prevented.

When (ii), i.e., the radius of curvature of the object-side surface of the negative lens L23 is close to zero, a positive spherical aberration generated in the negative lens L23 extremely increases, so a positive spherical aberration generated by only the second lens unit G2 cannot be satisfactorily corrected.

On the other hand, when D23/|r23| of conditional formula (5) is smaller than the lower limit value, (iii) the air gap along the optical axis between the biconcave lens L21 and the positive lens L22 may decrease, or (iv) the radius of curvature of the object-side surface of the negative lens L23 may be separated from zero.

When (iii), i.e., the air gap along the optical axis between the biconcave lens L21 and the positive lens L22 decreases, the biconcave lens L21 and the positive lens L22 mutually strengthen their refractive powers to obtain an appropriate back focus in the maximum wide-angle state. For this reason, a degradation in performance caused by an eccentricity generated in manufacturing increases.

When (iv), the radius of curvature of the object-side surface of the negative lens L23 changes from zero, the refractive power of the negative lens L23 is weakened, and the refractive power of the biconcave lens L21 is strengthened. The off-axis light flux passing through the biconcave lens L21 approaches the optical axis. Therefore, the on-axis aberration and the off-axis aberration cannot be independently corrected, so the variation in off-axis aberration generated in the operation for changing the state of lens positions cannot be satisfactorily corrected.

In the present invention, as described above, to reduce the total lens length in the maximum telephoto state and satisfactorily correct the variation in off-axis aberration generated in the operation for changing the state of lens positions, the positive portion lens system comprising at least two lens units which are independently movable in the operation for changing the state of lens positions is preferably arranged between the second lens unit G2 and the final lens unit Gb, and conditional formula (6) is preferably satisfied:

$$0.2 < (fst/fsw)/Z < 0.3 \qquad (6)$$

where fst: the synthesized focal length of the positive portion lens system in the largest focal length state fsw: the synthesized focal length of the positive portion lens system in the smallest focal length state Z: the zoom ratio Conditional formula (6) defines the ratio of the focal length of the positive portion lens system in the maximum wide-angle state to that in the maximum telephoto state.

When (fst/fsw)/Z of conditional formula (6) exceeds the upper limit value, the zooming action of the positive portion lens system becomes too large. Therefore, the refractive powers of the respective lens units constituting the positive portion lens system increase, or the length of the positive portion lens system along the optical axis in the maximum telephoto state increases.

When the refractive powers of the respective lens units constituting the positive lens system increase, the number of lenses constituting the each lens unit extremely increases, so size reduction of the lens system can hardly be achieved. When the length of the positive lens system along the optical axis in the maximum telephoto state increases, the off-axis light flux passing through the positive portion lens system is separated from the optical axis in the maximum telephoto state, and the lens diameter increases.

To the contrary, when (fst/fsw)/Z of conditional formula (6) is smaller than the lower limit value, a change in lateral magnification of the positive portion lens system with respect to a change in focal length of the entire lens system when the lens position state changes from the maximum wide-angle state to the maximum telephoto state becomes too small. Consequently, when a predetermined zoom ratio is to be obtained, changes in lateral magnification of other lens units become large. The variations in various aberrations generated in the operation for changing the state of lens positions increase, so high performance can hardly be achieved.

As described above, when the focal length of the entire lens system changes from the smallest focal length state to the largest focal length state, both the first lens unit G1 and the final lens unit Gb preferably move to the object side. Particularly, in the largest focal length state, to reduce the total lens length by effectively using the converging action of the first lens unit G1, the moving amount of the first lens unit G1 is preferably larger than the moving amount of the final lens unit Gb when the focal length of the entire lens system changes from the smallest focal length state, and the smallest focal length state is set as a reference.

In the present invention, the final lens unit Gb is arranged in the lens system to be closest to the image, as in the prior art. To satisfactorily correct the off-axis aberration in the maximum wide-angle state, a positive meniscus lens L51 with its concave surface facing the object side is preferably arranged to be closest to the object. In addition, in the following order from the object side, the positive meniscus lens L51 and a negative lens L52 with its concave surface facing the object side are preferably arranged while forming an air gap therebetween. Preferably, the positive spherical aberration generated in the final lens unit Gb is satisfactorily corrected by the air lens formed by this air gap.

In addition to the above conditions associated with the lens arrangement of the final lens unit Gb, conditional formula (7) is preferably satisfied:

$$0.03 < D5/|fb| < 0.1 \tag{7}$$

where

D5: the air gap along the optical axis between the positive meniscus lens L51 and the negative lens L52

Conditional formula (7) defines the air gap along the optical axis between the positive meniscus lens L51 and the negative lens L52.

When D5/|fb| of conditional formula (7) exceeds the upper limit value, no sufficient back focus can be obtained in the maximum wide-angle state.

To the contrary, when D5/|fb| of conditional formula (7) is smaller than the lower limit value, the positive meniscus lens L51 and the negative lens L52 mutually strengthen their refractive powers. As a result, the performance in the maximum telephoto state is extremely degraded by the eccentricity generated in manufacturing, so high performance can hardly be achieved.

In the present invention, as described above, the change in lateral magnification of the final lens unit Gb with respect to a change in focal length of the entire lens system when the lens position state changes from the maximum wide-angle state to the maximum telephoto state is relatively large. Therefore, to achieve high performance, the final lens unit Gb must further satisfactorily correct aberrations in a stand-alone state. In addition, to prevent a spherical aberration, the final lens unit Gb is preferably constituted by at least one positive lens and two negative lenses. Furthermore, to reduce the lens diameter closest to the image plane, preferably, a positive lens of the final lens unit Gb is arranged to be closest to the object, and a negative lens of the final lens unit Gb is arranged to be closest to the image plane.

From another viewpoint, in the present invention, to prevent a shooting failure caused by an image blur due to a camera fluctuation which is often generated with a zoom lens with high zoom ratio, a fluctuation detection system for detecting the fluctuation of the optical system and a driving means can be combined with the lens system. When one of the lens units constituting the optical system is entirely or partially decentered as a shift lens unit to shift the image and correct an image blur (a variation in image position) caused by the fluctuation of the optical system, which is detected by the fluctuation detection system, the variable focal length optical system of the present invention can be constituted as a so-called anti-vibration optical system.

In the present invention, when some of the lens units constituting the lens system are moved along the optical axis, focusing can be performed. Particularly, focusing is preferably performed by moving the lens unit arranged on the object side of the shift lens unit and on the image side of the first lens unit G1 along the optical axis.

The variable focal length optical system according to the present invention can be applied to not only a zoom lens but also a varifocal zoom lens whose focal length states are discontinuously present, as a matter of course.

In the following embodiments, though no specific numerical data are noted, when at least one aspherical surface is inserted in one lens unit or the plurality of lens units, the size of the lens system can be further reduced.

The embodiments of the present invention will be described below with reference to the accompanying drawings.

FIG. 1 is a view showing the refractive power arrangement of a variable focal length optical system according to each embodiment of the present invention, and the movement of each lens unit in an operation for changing the state of lens positions from a maximum wide-angle state (W) to a maximum telephoto state (T).

As shown in FIG. 1, the variable focal length optical system according to each embodiment of the present invention comprises, in the following order from the object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a negative refractive power. In the operation for changing the state of lens positions from the maximum wide-angle state to the maximum telephoto state, the lens units are moved to the object side such that the air gap between the first lens unit G1 and the second lens unit G2 increases, the air gap between the second lens unit G2 and the third lens unit G3 decreases, the air gap between the third lens unit G3 and the fourth lens unit G4 increases, and the air gap between the fourth lens unit G4 and the fifth lens unit G5 decreases. In the operation for changing the state of lens positions, the second lens unit G2 and the fourth lens unit G4 are integrally moved.

In each embodiment, the third lens unit G3 and the fourth lens unit G4 constitute a positive lens system, and the fifth lens unit G5 constitutes a final lens unit Gb.

[First Embodiment]

Figure 2:
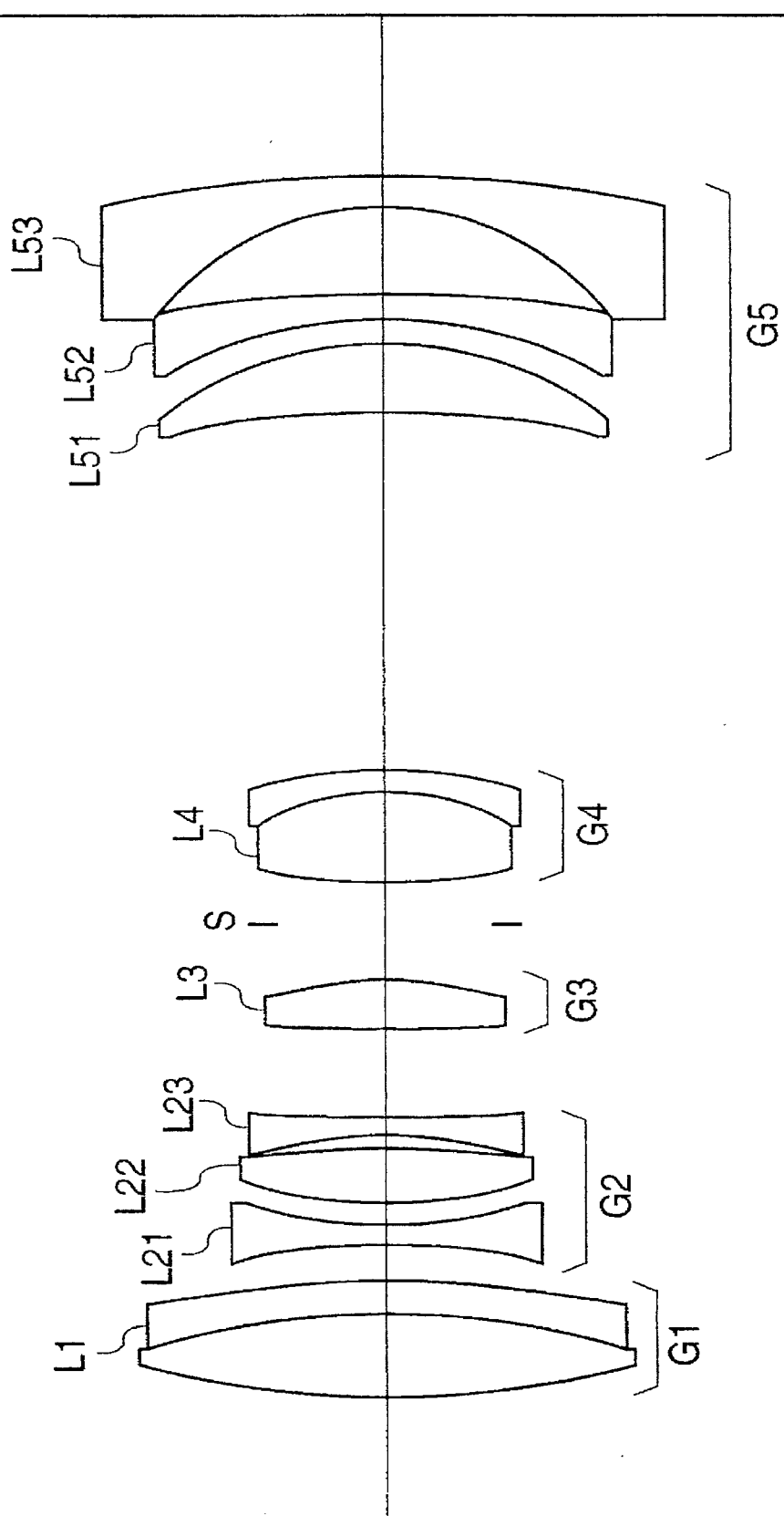
FIG. 2 is a view showing the lens arrangement of a variable focal length optical system according to the first embodiment of the present invention.

FIG. 2 is a diagram showing the lens arrangement of a variable focal length optical system according to the first embodiment of the present invention.

The variable focal length optical system shown in FIG. 2 comprises, in the following order from the object side, a first lens unit G1 consisting of a positive cemented lens L1 composed of a biconvex lens and a negative meniscus lens with its concave surface facing the object side, a second lens unit G2 consisting of a biconcave lens L21, a biconvex lens L22, and a negative meniscus lens L23 with its concave surface facing the object side, a third lens unit G3 consisting of a biconvex lens L3, a fourth lens unit G4 consisting of a positive cemented lens L4 composed of a biconvex lens and a negative meniscus lens with its concave surface facing the object side, and a fifth lens unit G5 consisting of a positive meniscus lens L51 with its concave surface facing the object side, a negative meniscus lens L52 with its concave surface facing the object side, and a negative meniscus lens L53 with its concave surface facing the object side.

An aperture stop S is arranged between the third lens unit G3 and the fourth lens unit G4 and moves integrally with the fourth lens unit G4 in the operation for changing the state of lens positions from the maximum wide-angle state to the maximum telephoto state.

FIG. 2 shows the positional relationship between the lens units in the maximum wide-angle state. The respective lens units move on the optical axis along zoom loci indicated by arrows in FIG. 1 in the operation for changing the state of lens positions to the maximum telephoto state.

In addition, focusing is performed by moving the third lens unit G3 along the optical axis.

Table 1 shows numerical data of the first embodiment of the present invention. In Table 1, f is the focal length, FNO is the F-number, ω is the half field angle, Bf is the back focus, and DO is the distance along the optical axis between the object and the surface closest to the object. In addition, the surface number represents the order of lens surfaces from the object side along the direction of propagation of the light beam, and the refractive index and Abbe number represent values for the d-line (λ=587.6 nm).

TABLE 1 f = 39.00 to 75.73 to 153.98
FNO = 4.46 to 6.96 to 10.97
ω = 29.06° to 15.41° to 7.81°

| Surface number | Radius of curvature | Surface-to-surface distance | Refractive index | Abbe number |
| --- | --- | --- | --- | --- |
| 1 | 53.0694 | 4.039 | 1.48749 | 70.45 |
| 2 | −42.2262 | 1.388 | 1.86074 | 23.01 |
| 3 | −68.7414 | (D3 = variable) | | |
| 4 | −31.6960 | 1.010 | 1.83500 | 42.97 |
| 5 | 22.2335 | 0.884 | | |
| 6 | 19.5737 | 2.903 | 1.80518 | 25.46 |
| 7 | −62.2141 | 0.631 | | |
| 8 | −22.2485 | 1.010 | 1.83500 | 43.97 |
| 9 | −195.8156 | (D9 = variable) | | |
| 10 | 1264.1360 | 2.146 | 1.51680 | 64.10 |
| 11 | −20.9008 | (D11 = variable) | | |
| 12 | ∞ | 2.272 | (aperture stop S) | |

TABLE 1-continued f = 39.00 to 75.73 to 153.98
FNO = 4.46 to 6.96 to 10.97
ω = 29.06° to 15.41° to 7.81°

| | | | | |
| --- | --- | --- | --- | --- |
| 13 | 27.9508 | 4.418 | 1.51680 | 64.10 |
| 14 | −11.9936 | 1.262 | 1.84666 | 23.83 |
| 15 | −22.8355 | (D15 = variable) | | |
| 16 | −48.8629 | 3.229 | 1.84666 | 23.83 |
| 17 | −19.3572 | 1.239 | | |
| 18 | −23.4000 | 1.262 | 1.80420 | 46.51 |
| 19 | −78.0116 | 4.236 | | |
| 20 | −14.3676 | 1.515 | 1.80420 | 46.51 |
| 21 | −72.2972 | (Bf) | | |

(Variable Distances in Operation for Changing the State of Lens Positions)

| f | 39.0002 | 75.7290 | 153.9831 |
| --- | --- | --- | --- |
| D3 | 2.1456 | 12.6969 | 24.6132 |
| D9 | 4.3122 | 2.4055 | 1.8932 |
| D11 | 2.6296 | 4.5363 | 5.0486 |
| D15 | 17.4446 | 9.9322 | 2.3981 |
| Bf | 7.9516 | 27.6471 | 64.6725 |

(Focusing Moving Amounts of Third Lens Unit G3 at Phototaking Magnification of 1/30 x)

| Focal length f | 39.0002 | 75.7290 | 153.9831 |
| --- | --- | --- | --- |
| DO | 1121.1247 | 2186.9182 | 4443.4165 |
| Moving amount | 1.1574 | 0.9634 | 1.0296 |

Movement from the object side to the image side is represented as a moving amount with a positive sign.

(Condition Corresponding Values)

| fb = | −25.0977 |
| --- | --- |
| f1 = | +78.3031 |
| M1 = | 64.1418 |
| Mb = | 56.7208 |
| fsw = | +20.8205 |
| fst = | +21.5774 |
| (1) |fb|/f1 | = 0.321 |
| (2) M1/f1 | = 0.819 |
| (3) |fb|/Mb | = 0.442 |
| (4) D/fw | = 0.592 |
| (5) D23/|r23| | = 0.040 |
| (6) (fst/fsw)/Z | = 0.262 |
| (7) D5/|fb| | = 0.049 |

FIGS. 3A to 8H are graphs showing various aberrations for the d-line (λ=587.6 nm) in the first embodiment. FIGS. 3A to 3H are graphs showing various aberrations in the infinite focus state in the maximum wide-angle state (smallest focal length state). FIGS. 4A to 4H are graphs showing various aberrations in the infinite focus state in the intermediate focal length state. FIGS. 5A to 5H are graphs showing various aberrations in the infinite focus state in the maximum telephoto state (largest focal length state).

FIGS. 6A to 6H are graphs showing various aberrations at a phototaking magnification of 1/30× in the maximum wide-angle state. FIGS. 7A to 7H are graphs showing various aberrations at the phototaking magnification of 1/30× in the intermediate focal length state. FIGS. 8A to 8H are graphs showing various aberrations at the phototaking magnification of 1/30× in the intermediate focal length state.

In these graphs, FNO is the F-number, NA is the numerical aperture, Y is the image height, A is the half field angle for each image height, and H is the object height for each image height.

In each graph showing an astigmatism, a solid curve represents the sagittal image plane, and a broken curve represents the meridional image plane. In addition, in each graph showing a spherical aberration, a broken curve represents the sine condition.

As can be seen from these graphs, in this embodiment, various aberrations are satisfactorily corrected in the respective shooting distance states and respective focal length states.

[Second Embodiment]

Figure 9:
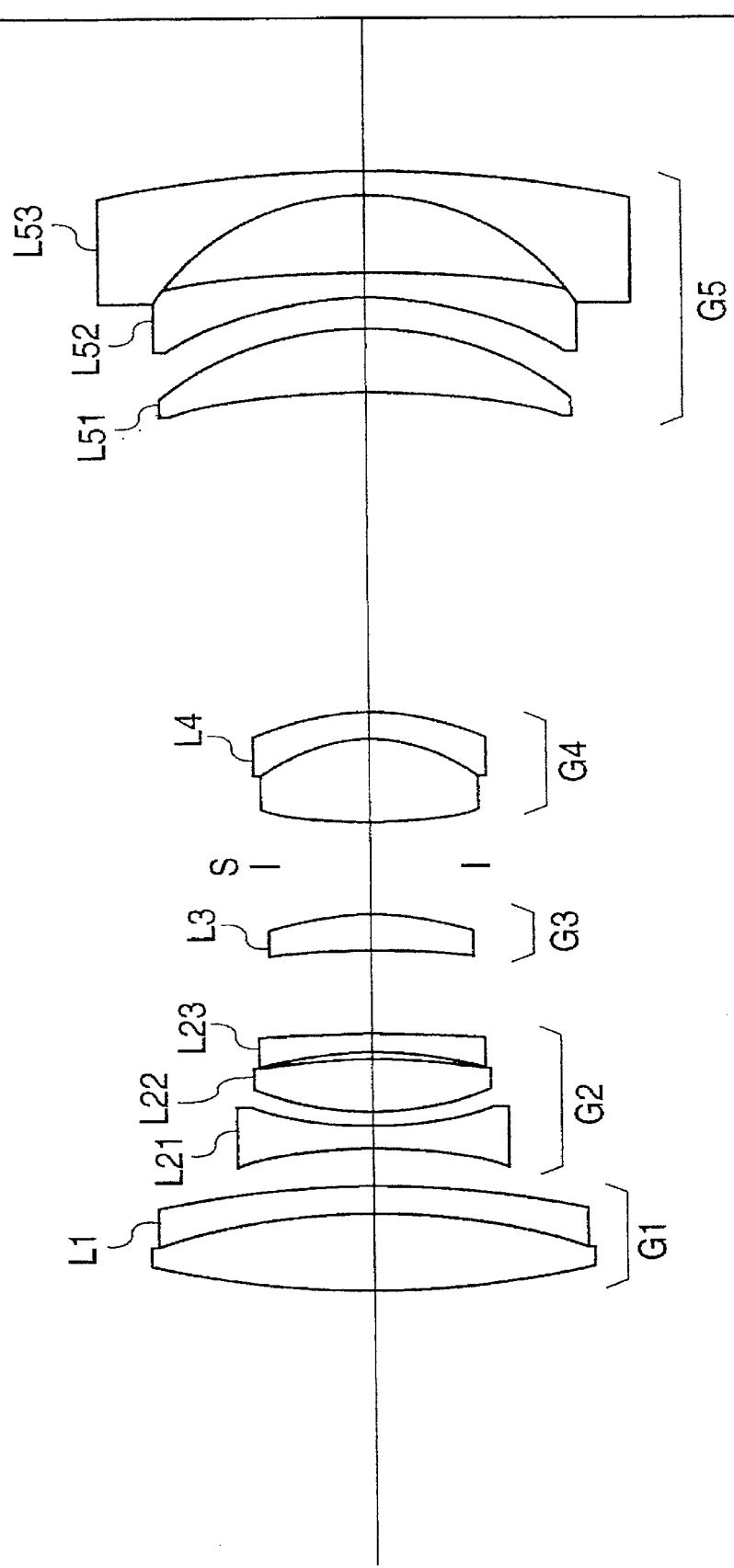
FIG. 9 is a view showing the lens arrangement of a variable focal length optical system according to the second embodiment of the present invention.
Figures 19A, 19B, 19C, 19D, 19E, 19F, 19G, 19H:
FIGS. 19A to 19H are graphs showing various aberrations in the infinite focus state in the maximum telephoto state of the third embodiment.

FIG. 9 is a diagram showing the lens arrangement of a variable focal length optical system according to the second embodiment of the present invention.

The variable focal length optical system shown in FIG. 9 comprises, in the following order from the object side, a first lens unit G1 consisting of a positive cemented lens L1 composed of a biconvex lens and a negative meniscus lens with its concave surface facing the object side, a second lens unit G2 consisting of a biconcave lens L21, a biconvex lens L22, and a negative meniscus lens L23 with its concave surface facing the object side, a third lens unit G3 consisting of a biconvex lens L3, a fourth lens unit G4 consisting of a positive cemented lens L4 composed of a biconvex lens and a negative meniscus lens with its concave surface facing the object side, and a fifth lens unit G5 consisting of a positive meniscus lens L51 with its concave surface facing the object side, a negative meniscus lens L52 with its concave surface facing the object side, and a negative meniscus lens L53 with its concave surface facing the object side.

An aperture stop S is arranged between the third lens unit G3 and the fourth lens unit G4 and moves integrally with the fourth lens unit G4 in the operation for changing the state of lens positions from the maximum wide-angle state to the maximum telephoto state.

FIG. 9 shows the positional relationship between the lens units in the maximum wide-angle state. The respective lens units move on the optical axis along zoom loci indicated by arrows in FIG. 1 in the operation for changing the state of lens positions to the maximum telephoto state.

In addition, focusing is performed by moving the third lens unit G3 along the optical axis.

Table 2 shows numerical data of the second embodiment of the present invention. In Table 2, f is the focal length, FNO is the F-number, ω is the half field angle, Bf is the back focus, and D0 is the distance along the optical axis between the object and the surface closest to the object. In addition, the surface number represents the order of lens surfaces from the object side along the direction of propagation of the light beam, and the refractive index and Abbe number represent values for the d-line ($\lambda$=587.6 nm).

TABLE 2 f = 39.00 to 75.73 to 153.99
FNO = 4.48 to 6.93 to 10.97
ω = 29.33° to 15.41° to 7.81°

| Surface number | Radius of curvature | Surface-to-surface distance | Refractive index | Abbe number |
|---|---|---|---|---|
| 1 | 50.5516 | 4.291 | 1.48749 | 70.45 |
| 2 | −40.7258 | 1.388 | 1.84666 | 23.83 |
| 3 | −67.5518 | (D3 = variable) | | |
| 4 | −29.3661 | 1.010 | 1.83500 | 42.97 |
| 5 | 19.6427 | 0.884 | | |
| 6 | 18.7262 | 2.651 | 1.80518 | 25.46 |
| 7 | −57.9712 | 0.631 | | |
| 8 | −22.9752 | 1.010 | 1.83500 | 43.97 |
| 9 | −125.0045 | (D9 = variable) | | |
| 10 | 1262.1360 | 2.019 | 1.48749 | 70.45 |
| 11 | −20.5115 | (D11 = variable) | | |
| 12 | ∞ | 2.272 | (aperture stop S) | |
| 13 | 28.1872 | 4.418 | 1.48749 | 70.45 |
| 14 | −11.4974 | 1.262 | 1.84666 | 23.83 |

TABLE 2-continued f = 39.00 to 75.73 to 153.99
FNO = 4.48 to 6.93 to 10.97
ω = 29.33° to 15.41° to 7.81°

| | | | | |
|---|---|---|---|---|
| 15 | −20.1493 | (D15 = variable) | | |
| 16 | −55.7597 | 3.408 | 1.84666 | 23.83 |
| 17 | −20.0522 | 1.557 | | |
| 18 | −22.0708 | 1.262 | 1.83500 | 43.97 |
| 19 | −80.7679 | 4.049 | | |
| 20 | −15.2249 | 1.515 | 1.77250 | 49.61 |
| 21 | −80.3585 | (Bf) | | |

(Variable Distances in Operation for Changing the State of Lens Positions)

| f | 39.0002 | 75.7300 | 153.9854 |
|---|---|---|---|
| D3 | 2.1456 | 12.6466 | 24.0598 |
| D9 | 4.2722 | 2.1564 | 1.8932 |
| D11 | 2.6695 | 4.7854 | 5.0486 |
| D15 | 17.7728 | 10.0913 | 2.0194 |
| Bf | 7.9519 | 27.5392 | 65.8801 |

(Focusing Moving Amounts of Third Lens Unit G3 at Phototaking Magnification of 1/30 x)

| Focal length f | 39.0002 | 75.7300 | 153.9854 |
|---|---|---|---|
| D0 | 1121.6154 | 2186.3244 | 4439.6426 |
| Moving amount | 1.1901 | 1.0163 | 1.1101 |

Movement from the object side to the image side is represented as a moving amount with a positive sign.
(Condition Corresponding Values)

| | |
|---|---|
| fb = | −25.7129 |
| f1 = | +75.5043 |
| M1 = | 64.0891 |
| Mb = | 57.9282 |
| fsw = | +21.2109 |
| fst = | +21.9564 |
| (1) lfbl/f1 | = 0.341 |
| (2) M1/f1 | = 0.849 |
| (3) lfbl/Mb | = 0.444 |
| (4) D/fw | = 0.589 |
| (5) D23/lr23l | = 0.038 |
| (6) (fst/fsw)/Z | = 0.262 |
| (7) D5/lfbl | = 0.061 |

FIGS. 10A to 15H are graphs showing various aberrations for the d-line ($\lambda$=587.6 nm) in the second embodiment. FIGS. 10A to 10H are graphs showing various aberrations in the infinite focus state in the maximum wide-angle state (smallest focal length state). FIGS. 11A to 11H are graphs showing various aberrations in the infinite focus state in the intermediate focal length state. FIGS. 12A to 12H are graphs showing various aberrations in the infinite focus state in the maximum telephoto state (largest focal length state).

FIGS. 13A to 13H are graphs showing various aberrations at a phototaking magnification of 1/30× in the maximum wide-angle state. FIGS. 14A to 14H are graphs showing various aberrations at the phototaking magnification of 1/30× in the intermediate focal length state. FIGS. 15A to 15H are graphs showing various aberrations at the phototaking magnification of 1/30× in the intermediate focal length state.

In these graphs, FNO is the F-number, NA is the numerical aperture, Y is the image height, A is the half field angle for each image height, and H is the object height for each image height.

In each graph showing an astigmatism, a solid curve represents the sagittal image plane, and a broken curve represents the meridional image plane. In addition, in each graph showing a spherical aberration, a broken curve represents the sine condition.

As can be seen from these graphs, in this embodiment, various aberrations are satisfactorily corrected in the respective shooting distance states and respective focal length states.

[Third Embodiment]

FIG. 16 is a diagram showing the lens arrangement of a variable focal length optical system according to the third embodiment of the present invention.

The variable focal length optical system shown in FIG. 16 comprises, in the following order from the object side, a first lens unit G1 consisting of a positive cemented lens L1 composed of a biconvex lens and a negative meniscus lens with its concave surface facing the object side, a second lens unit G2 consisting of a biconcave lens L21, a biconvex lens L22, and a negative meniscus lens L23 with its concave surface facing the object side, a third lens unit G3 consisting of a positive meniscus lens L3 with its concave surface facing the object side, a fourth lens unit G4 consisting of a positive cemented lens L4 composed of a biconvex lens and a negative meniscus lens with its concave surface facing the object side, and a fifth lens unit G5 consisting of a positive meniscus lens L51 with its concave surface facing the object side, a negative meniscus lens L52 with its concave surface facing the object side, and a negative meniscus lens L53 with its concave surface facing the object side.

An aperture stop S is arranged between the third lens unit G3 and the fourth lens unit G4 and moves integrally with the fourth lens unit G4 in the operation for changing the state of lens positions from the maximum wide-angle state to the maximum telephoto state.

FIG. 16 shows the positional relationship between the lens units in the maximum wide-angle state. The respective lens units move on the optical axis along zoom loci indicated by arrows in FIG. 1 in the operation for changing the state of lens positions to the maximum telephoto state.

In addition, focusing is performed by moving the third lens unit G3 along the optical axis.

Table 3 shows numerical data of the third embodiment of the present invention. In Table 3, f is the focal length, FNO is the F-number, ω is the half field angle, Bf is the back focus, and D0 is the distance along the optical axis between the object and the surface closest to the object. In addition, the surface number represents the order of lens surfaces from the object side along the direction of propagation of the light beam, and the refractive index and Abbe number represent values for the d-line (λ=587.6 nm).

TABLE 3 f = 39.00 to 75.73 to 153.99
FNO = 4.54 to 7.04 to 10.99
ω = 29.21° to 15.45° to 7.82°

| Surface number | Radius of curvature | Surface-to-surface distance | Refractive index | Abbe number |
| --- | --- | --- | --- | --- |
| 1 | 49.8824 | 4.291 | 1.48749 | 70.45 |
| 2 | −41.6032 | 1.388 | 1.84666 | 23.83 |
| 3 | −69.7940 | (D3 = variable) | | |
| 4 | −32.6638 | 1.010 | 1.83500 | 42.97 |
| 5 | 19.4609 | 1.010 | | |
| 6 | 18.8440 | 2.651 | 1.80518 | 25.46 |
| 7 | −56.2625 | 0.505 | | |
| 8 | −22.0164 | 1.010 | 1.83500 | 43.97 |
| 9 | −141.5164 | (D9 = variable) | | |
| 10 | −2309.8481 | 2.019 | 1.48749 | 70.45 |
| 11 | −20.0017 | (D11 = variable) | | |
| 12 | ∞ | 2.272 | (aperture stop S) | |
| 13 | 29.1795 | 4.418 | 1.48749 | 70.45 |

TABLE 3-continued f = 39.00 to 75.73 to 153.99
FNO = 4.54 to 7.04 to 10.99
ω = 29.21° to 15.45° to 7.82°

| | | | | |
| --- | --- | --- | --- | --- |
| 14 | −11.3672 | 1.262 | 1.84666 | 23.83 |
| 15 | −19.6237 | (D15 = variable) | | |
| 16 | −48.8910 | 3.408 | 1.84666 | 23.83 |
| 17 | −19.7867 | 1.704 | | |
| 18 | −22.4230 | 1.262 | 1.83500 | 43.97 |
| 19 | −81.3421 | 4.039 | | |
| 20 | −14.8022 | 1.515 | 1.77250 | 49.61 |
| 21 | −65.9694 | (Bf) | | |

(Variable Distances in Operation for Changing the State of Lens Positions)

| f | 39.0084 | 75.6782 | 153.9789 |
| --- | --- | --- | --- |
| D3 | 2.1456 | 12.7395 | 24.2747 |
| D9 | 4.2449 | 2.3726 | 1.8932 |
| D11 | 2.6968 | 4.5692 | 5.0485 |
| D15 | 17.4965 | 9.7233 | 2.0194 |
| Bf | 7.9519 | 27.5392 | 65.8801 |

(Focusing Moving Amounts of Third Lens Unit G3 at Phototaking Magnification of 1/30 x)

| Focal length f | 39.0084 | 75.6782 | 153.9789 |
| --- | --- | --- | --- |
| D0 | 1121.1334 | 2182.9498 | 4434.5217 |
| Moving amount | 1.2126 | 1.0409 | 1.1482 |

Movement from the object side to the image side is represented as a moving amount with a positive sign.
(Condition Corresponding Values)

| | |
| --- | --- |
| fb = | −25.4303 |
| f1 = | +75.9925 |
| M1 = | 64.2756 |
| Mb = | 57.6236 |
| fsw = | +21.5741 |
| fst = | +21.8937 |
| (1) lfbl/f1 | = 0.335 |
| (2) M1/f1 | = 0.846 |
| (3) lfbl/Mb | = 0.441 |
| (4) D/fw | = 0.589 |
| (5) D23/lr23l | = 0.046 |
| (6) (fst/fsw)/Z | = 0.257 |
| (7) D5/lfbl | = 0.067 |

FIGS. 17A to 22H are graphs showing various aberrations for the d-line (λ=587.6 nm) in the third embodiment. FIGS. 17A to 17H are graphs showing various aberrations in the infinite focus state in the maximum wide-angle state (smallest focal length state). FIGS. 18A to 18H are graphs showing various aberrations in the infinite focus state in the intermediate focal length state. FIGS. 19A to 19H are graphs showing various aberrations in the infinite focus state in the maximum telephoto state (largest focal length state).

FIGS. 20A to 20H are graphs showing various aberrations at a phototaking magnification of 1/30× in the maximum wide-angle state. FIGS. 21A to 21H are graphs showing various aberrations at the phototaking magnification of 1/30× in the intermediate focal length state. FIGS. 22A to 22H are graphs showing various aberrations at the phototaking magnification of 1/30× in the intermediate focal length state.

In these graphs, FNO is the F-number, NA is the numerical aperture, Y is the image height, A is the half field angle for each image height, and H is the object height for each image height.

In each graph showing an astigmatism, a solid curve represents the sagittal image plane, and a broken curve represents the meridional image plane. In addition, in each graph showing a spherical aberration, a broken curve represents the sine condition.

As can be seen from these graphs, in this embodiment, various aberrations are satisfactorily corrected in the respective shooting distance states and respective focal length states.

[Fourth Embodiment]

Figure 23:
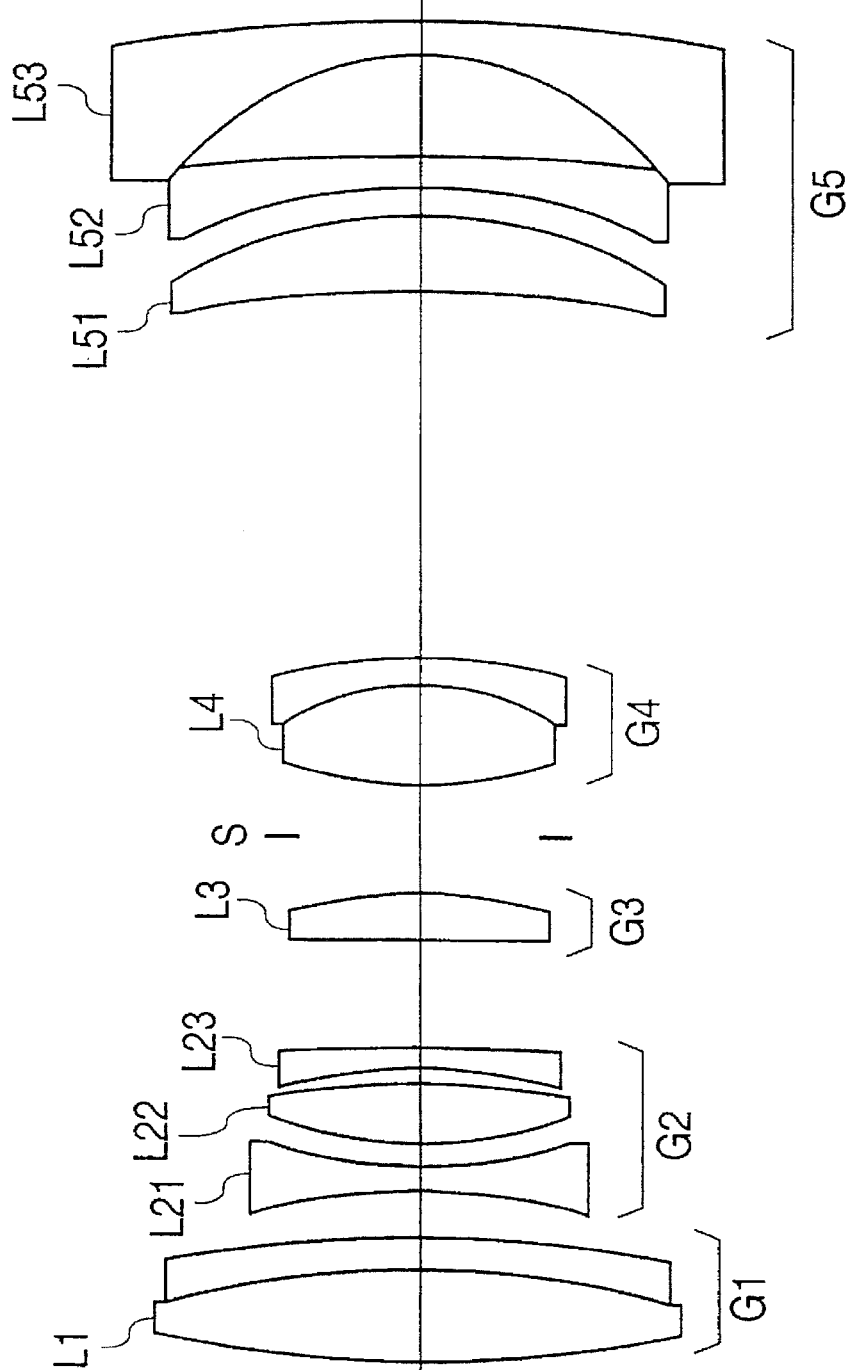
FIG. 23 is a view showing the lens arrangement of a variable focal length optical system according to the fourth embodiment of the present invention.

FIG. 23 is a diagram showing the lens arrangement of a variable focal length optical system according to the third embodiment of the present invention.

The variable focal length optical system shown in FIG. 23 comprises, in the following order from the object side, a first lens unit G1 consisting of a positive cemented lens L1 composed of a biconvex lens and a negative meniscus lens with its concave surface facing the object side, a second lens unit G2 consisting of a biconcave lens L21, a biconvex lens L22, and a negative meniscus lens L23 with its concave surface facing the object side, a third lens unit G3 consisting of a biconvex lens L3, a fourth lens unit G4 consisting of a positive cemented lens L4 composed of a biconvex lens and a negative meniscus lens with its concave surface facing the object side, and a fifth lens unit G5 consisting of a positive meniscus lens L51 with its concave surface facing the object side, a negative meniscus lens L52 with its concave surface facing the object side, and a negative meniscus lens L53 with its concave surface facing the object side.

An aperture stop S is arranged between the third lens unit G3 and the fourth lens unit G4 and moves integrally with the fourth lens unit G4 in the operation for changing the state of lens positions from the maximum wide-angle state to the maximum telephoto state.

FIG. 23 shows the positional relationship between the lens units in the maximum wide-angle state. The respective lens units move on the optical axis along zoom loci indicated by arrows in FIG. 1 in the operation for changing the state of lens positions to the maximum telephoto state.

In addition, focusing is performed by moving the third lens unit G3 along the optical axis.

Table 4 shows numerical data of the fourth embodiment of the present invention. In Table 4, f is the focal length, FNO is the F-number, ω is the half field angle, Bf is the back focus, and D0 is the distance along the optical axis between the object and the surface closest to the object. In addition, the surface number represents the order of lens surfaces from the object side along the direction of propagation of the light beam, and the refractive index and Abbe number represent values for the d-line (λ=587.6 nm).

TABLE 4 f = 39.00 to 75.62 to 153.96
FNO = 4.55 to 7.09 to 11.00
ω = 29.27° to 15.51° to 7.83°

| Surface number | Radius of curvature | Surface-to-surface distance | Refractive index | Abbe number |
|---|---|---|---|---|
| 1 | 53.7895 | 4.291 | 1.48749 | 70.45 |
| 2 | −43.1490 | 1.388 | 1.84666 | 23.83 |
| 3 | −72.4661 | (D3 = variable) | | |
| 4 | −32.7666 | 1.010 | 1.83500 | 42.97 |
| 5 | 22.7120 | 1.010 | | |
| 6 | 19.4978 | 2.777 | 1.80518 | 25.46 |
| 7 | −53.2461 | 0.505 | | |
| 8 | −21.8572 | 1.010 | 1.83500 | 43.97 |
| 9 | −953.9896 | (D9 = variable) | | |
| 10 | 1262.1360 | 2.019 | 1.48749 | 70.45 |
| 11 | −19.4641 | (D11 = variable) | | |
| 12 | ∞ | 2.272 | (aperture stop S) | |
| 13 | 25.8759 | 4.418 | 1.48749 | 70.45 |
| 14 | −11.8657 | 1.262 | 1.84666 | 23.83 |

TABLE 4-continued f = 39.00 to 75.62 to 153.96
FNO = 4.55 to 7.09 to 11.00
ω = 29.27° to 15.51° to 7.83°

| | | | | |
|---|---|---|---|---|
| 15 | −21.4900 | (D15 = variable) | | |
| 16 | −68.3213 | 3.408 | 1.84666 | 23.83 |
| 17 | −20.2172 | 1.136 | | |
| 18 | −24.2361 | 1.262 | 1.83500 | 43.97 |
| 19 | −173.3014 | 4.544 | | |
| 20 | −14.8022 | 1.515 | 1.72700 | 47.73 |
| 21 | −57.0356 | (Bf) | | |

(Variable Distances in Operation for Changing the State of Lens Positions)

| f | 38.9990 | 75.6161 | 153.9623 |
|---|---|---|---|
| D3 | 2.1456 | 13.2084 | 25.8788 |
| D9 | 4.3535 | 2.5478 | 1.8932 |
| D11 | 2.5883 | 4.3939 | 5.0485 |
| D15 | 17.1140 | 9.5066 | 2.0194 |
| Bf | 7.9514 | 27.8832 | 64.4781 |

(Focusing Moving Amounts of Third Lens Unit G3 at Phototaking Magnification of 1/30 x)

| Focal length f | 38.9990 | 75.6161 | 153.9623 |
|---|---|---|---|
| D0 | 1121.6572 | 2183.8174 | 4442.5574 |
| Moving amount | 1.1208 | 0.9320 | 0.9971 |

Movement from the object side to the image side is represented as a moving amount with a positive sign.
(Condition Corresponding Values)

| | |
|---|---|
| fb = | −25.5325 |
| f1 = | +81.1276 |
| M1 = | 65.1653 |
| Mb = | 56.5268 |
| fsw = | +20.7194 |
| fst = | +21.4913 |
| (1) |fb|/f1 | = 0.315 |
| (2) M1/f1 | = 0.803 |
| (3) |fb|/Mb | = 0.452 |
| (4) D/fw | = 0.592 |
| (5) D23/|r23| | = 0.046 |
| (6) (fst/fsw)/Z | = 0.263 |
| (7) D5/|fb| | = 0.044 |

FIGS. 24A to 29H are graphs showing various aberrations for the d-line (λ=587.6 nm) in the fourth embodiment. FIGS. 24A to 24H are graphs showing various aberrations in the infinite focus state in the maximum wide-angle state (smallest focal length state). FIGS. 25A to 25H are graphs showing various aberrations in the infinite focus state in the intermediate focal length state. FIGS. 26A to 26H are graphs showing various aberrations in the infinite focus state in the maximum telephoto state (largest focal length state).

FIGS. 27A to 27H are graphs showing various aberrations at a phototaking magnification of 1/30× in the maximum wide-angle state. FIGS. 28A to 28H are graphs showing various aberrations at the phototaking magnification of 1/30× in the intermediate focal length state. FIGS. 29A to 29H are graphs showing various aberrations at the phototaking magnification of 1/30× in the intermediate focal length state.

In these graphs, FNO is the F-number, NA is the numerical aperture, Y is the image height, A is the half field angle for each image height, and H is the object height for each image height.

In each graph showing an astigmatism, a solid curve represents the sagittal image plane, and a broken curve represents the meridional image plane. In addition, in each graph showing a spherical aberration, a broken curve represents the sine condition.

As can be seen from these graphs, in this embodiment, various aberrations are satisfactorily corrected in the respective shooting distance states and respective focal length states.

[Fifth Embodiment]

Figure 30:
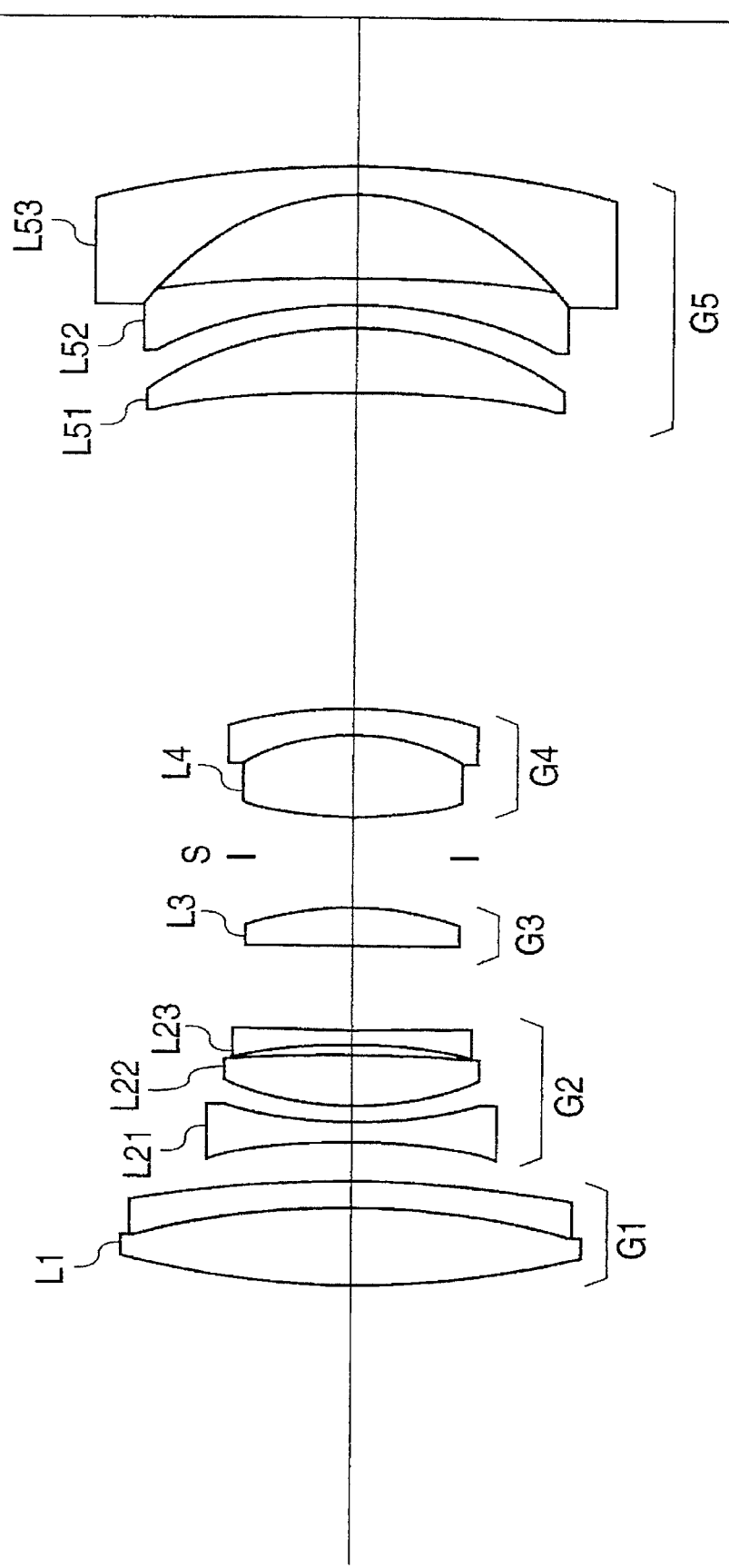
FIG. 30 is a view showing the lens arrangement of a variable focal length optical system according to the fifth embodiment of the present invention.

FIG. 30 is a diagram showing the lens arrangement of a variable focal length optical system according to the fifth embodiment of the present invention.

The variable focal length optical system shown in FIG. 30 comprises, in the following order from the object side, a first lens unit G1 consisting of a positive cemented lens L1 composed of a biconvex lens and a negative meniscus lens with its concave surface facing the object side, a second lens unit G2 consisting of a biconcave lens L21, a biconvex lens L22, and a negative meniscus lens L23 with its concave surface facing the object side, a third lens unit G3 consisting of a biconvex lens L3, a fourth lens unit G4 consisting of a positive cemented lens L4 composed of a biconvex lens and a negative meniscus lens with its concave surface facing the object side, and a fifth lens unit G5 consisting of a positive meniscus lens L51 with its concave surface facing the object side, a negative meniscus lens L52 with its concave surface facing the object side, and a negative meniscus lens L53 with its concave surface facing the object side.

An aperture stop S is arranged between the third lens unit G3 and the fourth lens unit G4 and moves integrally with the fourth lens unit G4 in the operation for changing the state of lens positions from the maximum wide-angle state to the maximum telephoto state.

FIG. 30 shows the positional relationship between the lens units in the maximum wide-angle state. The respective lens units move on the optical axis along zoom loci indicated by arrows in FIG. 1 in the operation for changing the state of lens positions to the maximum telephoto state.

In addition, focusing is performed by moving the third lens unit G3 along the optical axis.

Table 5 shows numerical data of the fifth embodiment of the present invention. In Table 5, f is the focal length, FNO is the F-number, ω is the half field angle, Bf is the back focus, and D0 is the distance along the optical axis between the object and the surface closest to the object. In addition, the surface number represents the order of lens surfaces from the object side along the direction of propagation of the light beam, and the refractive index and Abbe number represent values for the d-line ($\lambda$=587.6 nm).

TABLE 5 f = 39.00 to 75.73 to 153.97
FNO = 4.52 to 7.07 to 10.91
ω = 28.99° to 15.41° to 7.79°

| Surface number | Radius of curvature | Surface-to-surface distance | Refractive index | Abbe number |
|---|---|---|---|---|
| 1 | 50.4858 | 4.291 | 1.48749 | 70.45 |
| 2 | −43.9036 | 1.388 | 1.84666 | 23.83 |
| 3 | −73.8093 | (D3 = variable) | | |
| 4 | −30.1948 | 1.010 | 1.83500 | 42.97 |
| 5 | 21.5336 | 1.010 | | |
| 6 | 19.0199 | 2.903 | 1.75520 | 27.53 |
| 7 | −35.1365 | 0.631 | | |
| 8 | −20.7615 | 1.010 | 1.83500 | 43.97 |
| 9 | −296.1808 | (D9 = variable) | | |
| 10 | 1262.1360 | 2.019 | 1.48749 | 70.45 |
| 11 | −19.6222 | (D11 = variable) | | |
| 12 | ∞ | 2.272 | (aperture stop S) | |
| 13 | 24.9633 | 4.418 | 1.48749 | 70.45 |
| 14 | −12.6995 | 1.262 | 1.84666 | 23.83 |

TABLE 5-continued f = 39.00 to 75.73 to 153.97
FNO = 4.52 to 7.07 to 10.91
ω = 28.99° to 15.41° to 7.79°

| | | | | |
|---|---|---|---|---|
| 15 | −23.8723 | (D15 = variable) | | |
| 16 | −67.4387 | 3.408 | 1.84666 | 23.83 |
| 17 | −21.6935 | 1.262 | | |
| 18 | −27.3777 | 1.262 | 1.81550 | 44.54 |
| 19 | −156.2222 | 4.488 | | |
| 20 | −14.2729 | 1.515 | 1.77250 | 49.61 |
| 21 | −91.7073 | (Bf) | | |

(Variable Distances in Operation for Changing the state of Lens Positions)

| f | 38.9997 | 75.7269 | 153.9760 |
|---|---|---|---|
| D3 | 2.1456 | 12.6276 | 24.8463 |
| D9 | 4.8110 | 3.0745 | 1.8932 |
| D11 | 2.7619 | 4.4984 | 5.6796 |
| D15 | 16.6231 | 9.0536 | 2.0194 |
| Bf | 7.9513 | 27.4254 | 60.9925 |

(Focusing Moving Amounts of Third Lens Unit G3 at Phototaking Magnification of 1/30 x)

| Focal length f | 38.9997 | 75.7269 | 153.9760 |
|---|---|---|---|
| D0 | 1116.9847 | 2179.2192 | 4417.0494 |
| Moving amount | 1.2735 | 1.0762 | 1.2403 |

Movement from the object side to the image side is represented as a moving amount with a positive sign.
(Condition Corresponding Values)

| | |
|---|---|
| fb = | −24.2992 |
| f1 = | +77.8836 |
| M1 = | 61.1383 |
| Mb = | 53.0412 |
| fsw = | +21.2265 |
| fst = | +22.1418 |
| (1) \|fb\|/f1 | = 0.312 |
| (2) M1/f1 | = 0.785 |
| (3) \|fb\|/Mb | = 0.458 |
| (4) D/fw | = 0.689 |
| (5) \|D23/r23\| | = 0.049 |
| (6) (fst/fsw)/Z | = 0.264 |
| (7) D5/\|fb\| | = 0.052 |

FIGS. 31A to 36H are graphs showing various aberrations for the d-line ($\lambda$=587.6 nm) in the fifth embodiment. FIGS. 31A to 31H are graphs showing various aberrations in the infinite focus state in the maximum wide-angle state (smallest focal length state). FIGS. 32A to 32H are graphs showing various aberrations in the infinite focus state in the intermediate focal length state. FIGS. 33A to 33H are graphs showing various aberrations in the infinite focus state in the maximum telephoto state (largest focal length state).

FIGS. 34A to 34H are graphs showing various aberrations at a phototaking magnification of 1/30× in the maximum wide-angle state. FIGS. 35A to 35H are graphs showing various aberrations at the phototaking magnification of 1/30× in the intermediate focal length state. FIGS. 36A to 36H are graphs showing various aberrations at the phototaking magnification of 1/30× in the intermediate focal length state.

In these graphs, FNO is the F-number, NA is the numerical aperture, Y is the image height, A is the half field angle for each image height, and H is the object height for each image height.

In each graph showing an astigmatism, a solid curve represents the sagittal image plane, and a broken curve represents the meridional image plane. In addition, in each graph showing a spherical aberration, a broken curve represents the sine condition.

As can be seen from these graphs, in this embodiment, various aberrations are satisfactorily corrected in the respective shooting distance states and respective focal length states.

[Sixth Embodiment]

FIG. 37 is a diagram showing the lens arrangement of a variable focal length optical system according to the sixth embodiment of the present invention.

The variable focal length optical system shown in FIG. 37 comprises, in the following order from the object side, a first lens unit G1 consisting of a positive cemented lens L1 composed of a biconvex lens and a negative meniscus lens with its concave surface facing the object side, a second lens unit G2 consisting of a biconcave lens L21, a biconvex lens L22, and a biconcave lens L23 with its concave surface facing the object side, a third lens unit G3 consisting of a positive meniscus lens L3 with its concave surface facing the object side, a fourth lens unit G4 consisting of a positive cemented lens L4 composed of a biconvex lens and a negative meniscus lens with its concave surface facing the object side, and a fifth lens unit G5 consisting of a positive meniscus lens L51 with its concave surface facing the object side, a negative meniscus lens L52 with its concave surface facing the object side, and a negative meniscus lens L53 with its concave surface facing the object side.

An aperture stop S is arranged between the third lens unit G3 and the fourth lens unit G4 and moves integrally with the fourth lens unit G4 in the operation for changing the state of lens positions from the maximum wide-angle state to the maximum telephoto state.

FIG. 37 shows the positional relationship between the lens units in the maximum wide-angle state. The respective lens units move on the optical axis along zoom loci indicated by arrows in FIG. 1 in the operation for changing the state of lens positions to the maximum telephoto state.

In addition, focusing is performed by moving the third lens unit G3 along the optical axis.

Table 6 shows numerical data of the sixth embodiment of the present invention. In Table 6, f is the focal length, FNO is the F-number, ω is the half field angle, Bf is the back focus, and D0 is the distance along the optical axis between the object and the surface closest to the object. In addition, the surface number represents the order of lens surfaces from the object side along the direction of propagation of the light beam, and the refractive index and Abbe number represent values for the d-line ($\lambda=587.6$ nm).

TABLE 6 f = 39.00 to 75.69 to 113.71 to 154.47
FNO = 4.54 to 7.06 to 9.20 to 11.00
ω = 29.00° to 15.49° to 10.51° to 7.81°

| Surface number | Radius of curvature | Surface-to-surface distance | Refractive index | Abbe number |
|---|---|---|---|---|
| 1 | 55.0718 | 4.292 | 1.48749 | 70.41 |
| 2 | −41.5924 | 1.389 | 1.84666 | 23.82 |
| 3 | −70.1285 | (D3 = variable) | | |
| 4 | −37.8468 | 1.010 | 1.80411 | 46.54 |
| 5 | 24.5915 | 1.010 | | |
| 6 | 18.9446 | 2.651 | 1.80458 | 25.50 |
| 7 | −124.5855 | 0.758 | | |
| 8 | −21.4527 | 1.010 | 1.80411 | 46.54 |
| 9 | 3981.5402 | (D9 = variable) | | |
| 10 | −402.4306 | 2.020 | 1.51680 | 64.20 |
| 11 | −18.7015 | (D11 = variable) | | |
| 12 | ∞ | 1.136 | (aperture stop S) | |
| 13 | 23.7524 | 4.166 | 1.48749 | 70.41 |

TABLE 6-continued f = 39.00 to 75.69 to 113.71 to 154.47
FNO = 4.54 to 7.06 to 9.20 to 11.00
ω = 29.00° to 15.49° to 10.51° to 7.81°

| | | | | |
|---|---|---|---|---|
| 14 | −12.0033 | 1.263 | 1.84666 | 23.82 |
| 15 | −22.7267 | (D15 = variable) | | |
| 16 | −54.4990 | 3.409 | 1.84666 | 23.82 |
| 17 | −18.7464 | 1.199 | | |
| 18 | −21.7131 | 1.263 | 1.84042 | 43.35 |
| 19 | −91.7206 | 4.482 | | |
| 20 | −13.4814 | 1.515 | 1.80411 | 46.54 |
| 21 | −46.4045 | (Bf) | | |

(Variable Distances in Operation for Changing the State of Lens Positions)

| f | 39.0000 | 75.6863 | 113.7126 | 154.4748 |
|---|---|---|---|---|
| D3 | 1.5150 | 12.8299 | 19.7905 | 25.6744 |
| D9 | 4.3642 | 2.6094 | 2.0340 | 1.8937 |
| D11 | 2.5795 | 4.3343 | 4.9097 | 5.0500 |
| D15 | 16.5814 | 9.0130 | 4.8237 | 1.6412 |
| Bf | 7.9576 | 27.9591 | 46.7499 | 64.9067 |

(Focusing Moving Amounts of Third Lens Unit G3 at Phototaking Magnification of 1/30 x)

| Focal length f | 39.0000 | 75.6863 | 113.7126 | 154.4748 |
|---|---|---|---|---|
| D0 | 1120.8286 | 2183.7963 | 3285.7963 | 4452.1292 |
| Moving amount | 1.1167 | 0.9330 | 0.9084 | 1.0050 |

Movement from the object side to the image side is represented as a moving amount with a positive sign.
(Condition Corresponding Values)

| fb = | −25.4143 |
|---|---|
| f1 = | +81.9831 |
| M1 = | 66.1683 |
| Mb = | 56.9491 |
| fsw = | +19.9628 |
| fst = | +20.6639 |
| (1) lfbl/f1 | = 0.310 |
| (2) M1/f1 | = 0.807 |
| (3) lfbl/Mb | = 0.446 |
| (4) D/fw | = 0.579 |
| (5) D23/lr23l | = 0.047 |
| (6) (fst/fsw)/Z | = 0.261 |
| (7) D5/lfbl | = 0.047 |

FIGS. 38A to 45H are graphs showing various aberrations for the d-line ($\lambda=587.6$ nm) in the sixth embodiment. FIGS. 38A to 38H are graphs showing various aberrations in the infinite focus state in the maximum wide-angle state (smallest focal length state). FIGS. 39A to 39H are graphs showing various aberrations in the infinite focus state in the first intermediate focal length state. FIGS. 40A to 40H are graphs showing various aberrations in the infinite focus state in the second intermediate focal length state. FIGS. 41A to 41H are graphs showing various aberrations in the infinite focus state in the maximum telephoto state (largest focal length state).

FIGS. 42A to 42H are graphs showing various aberrations at a phototaking magnification of 1/30× in the maximum wide-angle state. FIGS. 43A to 43H are graphs showing various aberrations at the phototaking magnification of 1/30× in the first intermediate focal length state. FIGS. 44A to 44H are graphs showing various aberrations at the phototaking magnification of 1/30× in the second intermediate focal length state. FIGS. 45A to 45H are graphs showing various aberrations at the phototaking magnification of 1/30× in the intermediate focal length state.

In these graphs, FNO is the F-number, NA is the numerical aperture, Y is the image height, A is the half field angle for each image height, and H is the object height for each image height.

In each graph showing an astigmatism, a solid curve represents the sagittal image plane, and a broken curve represents the meridional image plane. In addition, in each graph showing a spherical aberration, a broken curve represents the sine condition.

As can be seen from these graphs, in this embodiment, various aberrations are satisfactorily corrected in the respective shooting distance states and respective focal length states.

Having described preferred embodiments of the present invention, it is to be understood that any variations will occur to those skilled in the art within the scope of the appended claims.

What is claimed is:

1. A variable focal length optical system comprising:
   a first lens unit (G1) having a positive refractive power and arranged to be closest to an object;
   a final lens unit (Gb) having a negative refractive power and arranged to be closest to an image,
   said first lens unit (G1) and said final lens unit (Gb) moving to said object side when a focal length of an entire lens system changes from a smallest focal length state to a largest focal length state; and
   an aperture stop arranged on said image side of said first lens unit (G1) and on said object side of said final lens unit (Gb),
   wherein said system satisfies the following conditions:

$0.25 < |fb|/f1 < 0.45$ $0.7 < M1/f1 < 0.9$ $0.4 < |fb|/Mb < 0.5$ $D/fw < 0.7$ where f1 is the focal length of said first lens unit (G1), fb is the focal length of said final lens unit (Gb), M1 is the moving amount of said first lens unit (G1) to said object side, which is obtained when the focal length of said entire lens system changes from the smallest focal length state to the largest focal length state, Mb is the moving amount of said final lens unit (Gb) to said object side, which is obtained when the focal length of said entire lens system changes from the smallest focal length state to the largest focal length state, D is the distance along an optical axis between a surface of said lens system, which is closest to said object, and said aperture stop in the smallest focal length state, and fw is the focal length of said entire lens system in the smallest focal length state.

2. A system according to claim 1, further comprising
   a second lens unit (G2) having a negative refractive power and arranged adjacent to said image side of said first lens unit (G1),
   said second lens unit (G2) having, in the following order from said object side, a biconcave lens (L21), a positive lens (L22) with a convex surface facing said object side, and a negative lens (L23) with a concave surface facing said object side, and
   wherein said system satisfies the following condition:

$0.03 < |D23/r23| < 0.07$ where D23 is the air gap along the optical axis between said biconcave lens (L21) and said positive lens (L22), and r23 is the radius of curvature of said object-side surface of said negative lens (L23).

3. A system according to claim 2, further comprising
   a positive portion lens system including at least two positive lens units, having a positive synthesized focal length, and arranged between said second lens unit (G2) and said final lens unit (Gb), and
   wherein said system satisfies the following condition:

$0.2 < (fst/fsw)/Z < 0.3$ where fst is the synthesized focal length of said positive portion lens system in the largest focal length state, fsw is the synthesized focal length of said positive portion lens system in the smallest focal length state, and Z is the zoom ratio.

4. A system according to claim 3, wherein, when the smallest focal length state is set as a reference, and the focal length of said entire lens system changes from the smallest focal length state to the largest focal length state, the moving amount of said final lens unit (Gb) is smaller than that of said first lens unit (G1).

5. A system according to claim 4, wherein said final lens unit (Gb) has at least a positive meniscus lens (L51) with a convex surface facing said image side, and a negative lens (L52) with a concave surface facing said object side, which are arranged in this order from said object side while forming an air gap therebetween, and
   said system satisfies the following condition:

$0.03 < D5/|fb| < 0.1$ where D5 is the air gap along the optical axis between said positive meniscus lens (L51) and said negative lens (L52), and fb is the focal length of said final lens unit (Gb).

6. A system according to claim 1, wherein, when the smallest focal length state is set as a reference, and the focal length of said entire lens system changes from the smallest focal length state to the largest focal length state, the moving amount of said final lens unit (Gb) is smaller than that of said first lens unit (G1).

7. A system according to claim 6, wherein said final lens unit (Gb) has at least a positive meniscus lens (L51) with a convex surface facing said image side, and a negative lens (L52) with a concave surface facing said object side, which are arranged in this order from said object side while forming an air gap therebetween, and
   said system satisfies the following condition:

$0.03 < D5/|fb| < 0.1$ where D5 is the air gap along the optical axis between said positive meniscus lens (L51) and said negative lens (L52), and fb is the focal length of said final lens unit (Gb).

* * * * *